(12) United States Patent
Lockett et al.

(10) Patent No.: US 12,346,960 B2
(45) Date of Patent: Jul. 1, 2025

(54) SYSTEMS AND METHODS FOR GENERATING VIRTUAL TAGS FOR ITEMS IN A PHYSICAL ENVIRONMENT

(71) Applicant: Capital One Services, LLC, McLean, VA (US)

(72) Inventors: Kimberley Tamara Lockett, Richmond, VA (US); Michael Mossoba, Great Falls, VA (US); Jerry Wagner, Chesterfield, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 296 days.

(21) Appl. No.: 18/051,681

(22) Filed: Nov. 1, 2022

(65) Prior Publication Data
US 2024/0144338 A1 May 2, 2024

(51) Int. Cl.
*G06Q 30/00* (2023.01)
*G06F 16/535* (2019.01)
(Continued)

(52) U.S. Cl.
CPC ....... *G06Q 30/0643* (2013.01); *G06F 16/535* (2019.01); *G06F 16/587* (2019.01);
(Continued)

(58) Field of Classification Search
CPC ....... G06T 19/006; G06F 3/017; G06F 3/048; G06F 3/0481; G06F 3/0487–04883; G06F 16/535; G06F 16/587; G06F 16/583; G06V 20/20; G06V 10/70; G06V 10/74; G06V 10/764; G06V 20/52; G06Q 30/0643; G06Q 30/0623; G06Q 30/0631
See application file for complete search history.

(56) References Cited

U.S. PATENT DOCUMENTS 8,606,645 B1 12/2013 Applefeld
8,626,611 B2 1/2014 Bravo
(Continued)

OTHER PUBLICATIONS

Souza-Herod, Phelippe, Augmented Reality Shopping Framework, Mar. 10, 2021, SoutheastCon 2021, pp. 1-6 (Year: 2021).*

*Primary Examiner* — William J Allen
*Assistant Examiner* — Timothy J Kang
(74) *Attorney, Agent, or Firm* — Bookoff McAndrews, PLLC

(57) ABSTRACT

Disclosed are methods and systems for generating a virtual tag for an item in a physical environment. For instance, an image of the physical environment captured by and displayed on a user interface of a computing device may be provided as input to a trained machine learning model configured to identify the item including a first subset of item attributes. The item may be identified and information associated with the item, including a second subset of item attributes, may be received from a data store using the first subset. A spatial location of the item may be identified in the image. An icon may be generated for the item and rendered by the computing device for display on the user interface in association with the spatial location of the item in the image. The icon may be indicative of at least one item attribute from the first or second subset.

19 Claims, 9 Drawing Sheets

(51) Int. Cl.
    *G06F 16/587* (2019.01)
    *G06Q 30/0601* (2023.01)
    *G06V 10/70* (2022.01)

(52) U.S. Cl.
    CPC ..... *G06Q 30/0623* (2013.01); *G06Q 30/0631* (2013.01); *G06V 10/70* (2022.01)

(56) References Cited

U.S. PATENT DOCUMENTS

| | | | |
|---|---|---|---|
| 10,789,783 B2* | 9/2020 | Stansell | G06F 3/0482 |
| 2017/0061525 A1 | 3/2017 | McCoy et al. | |
| 2019/0156402 A1* | 5/2019 | Greenberger | G06Q 30/0643 |
| 2020/0226380 A1* | 7/2020 | Barras | G06Q 30/0623 |
| 2023/0022712 A1* | 1/2023 | Yoo | G06Q 30/06 |

* cited by examiner

SYSTEMS AND METHODS FOR GENERATING VIRTUAL TAGS FOR ITEMS IN A PHYSICAL ENVIRONMENT

TECHNICAL FIELD

Various embodiments of this disclosure relate generally to techniques for processing images of a physical environment to identify items therein, and, more particularly, to systems and methods for generating virtual tags for the items identified.

BACKGROUND

In some instances, a retailer may house a large number of items within a physical store, warehouse, or site that may span thousands of square feet. A customer may be interested in an item having a specific set of attributes. For example, from a furniture retailer, the customer may be interested in a furniture item made by a particular manufacturer that is of a desired size or dimension and is within a price range that fits the customer's budget. However, when a customer is shopping or browsing for items within the physical store, the customer may have to travel throughout the vast physical store and closely read a physical tag for the item (e.g., a hand tag and/or a hang tag) that includes information about the item, such as the manufacturer, measurements, price, etc., in order to determine whether a given item fits the desired set of attributes. The information on the physical tag may often be printed in a small font size, and the physical tag may be attached to the item such that it hangs low to the ground. Resultantly, the customer may spend several hours at the physical store studying dozens to hundreds of physical tags to locate and purchase the item. The time investment and high effort required by the customer to perform self-filtering via examination of physical tags, particularly if the customer has limited mobility and/or vision impairments, may often lead to a physically and/or mentally draining experience that negatively impacts the customer and may result in a customer walk out and/or lost sales.

This disclosure is directed to addressing the above-referenced challenges, among other challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for generating virtual tags for items. A physical environment may include a plurality of items, and the methods and systems may enable generation of virtual tags for one or more items of the plurality of items that are identified within an image captured by a computing device located in the physical environment.

For instance, one exemplary computer-implemented method may include receiving an image of a physical environment. The image may be captured by a computing device and displayed on a user interface of the computing device. The physical environment may include a plurality of items each having item attributes. The method may also include receiving one or more item filter criteria associated with at least one of the item attributes, and providing the image as input to a trained machine learning model configured to identify an item from the plurality of items that is present in the image, including a first subset of the item attributes for the item. The method may further include using the first subset to identify the item from a data store, receiving information associated with the item from the data store, the information including a second subset of the item attributes for the item, and determining that the item matches the one or more item filter criteria based on the first subset and the second subset. The method may further include identifying a spatial location of the item in the image, and generating an icon for the item that is rendered by the computing device for display on the user interface in association with the spatial location of the item in the image. The icon may be indicative of at least one of the item attributes for the item from the first subset or the second subset.

An exemplary system may include at least one memory storing instructions, and at least one processor operatively connected to the at least one memory and configured to execute the instructions to perform operations. The operations may include receiving an image of a physical environment. The image may be captured by a computing device and displayed on a user interface of the computing device. The physical environment may include a plurality of items each having item attributes. The operations may also include providing the image as input to a trained machine learning model configured to identify an item from the plurality of items that is present in the image, including a first subset of the item attributes for the item, using the first subset to identify the item from the data store, and receiving information associated with the item from the data store, the information including a second subset of the item attributes for the item. The operations may further comprise identifying a spatial location of the item in the image, and generating an icon for the item that is rendered by the computing device for display on the user interface in association with the spatial location of the item in the image. The icon may be indicative of at least one of the item attributes for the item from the first subset or the second subset.

Another exemplary method implemented by a computing device may include capturing an image of a physical environment, the physical environment including a plurality of items each having item attributes, and displaying the image on a user interface of the computing device. The method may also include providing the image as input to a trained machine learning model configured to identify an item from the plurality of items that is present in the image, including a first subset of the item attributes for the item, identifying a spatial location of the item in the image, and transmitting a virtual tag request for the item that includes the first subset and the spatial location of the item to a system providing virtual tag generation services. The system may be configured to identify the item from a data store using the first subset, receive information associated with the item from the data store, including a second subset of the item attributes for the item, and generate an icon for the item indicative of at least one of the item attributes for the item from the first subset or the second subset. The method may further include rendering the icon for display on the user interface in association with the spatial location of the item in the image based on instructions received from the system responsive to the virtual tag request.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1A:
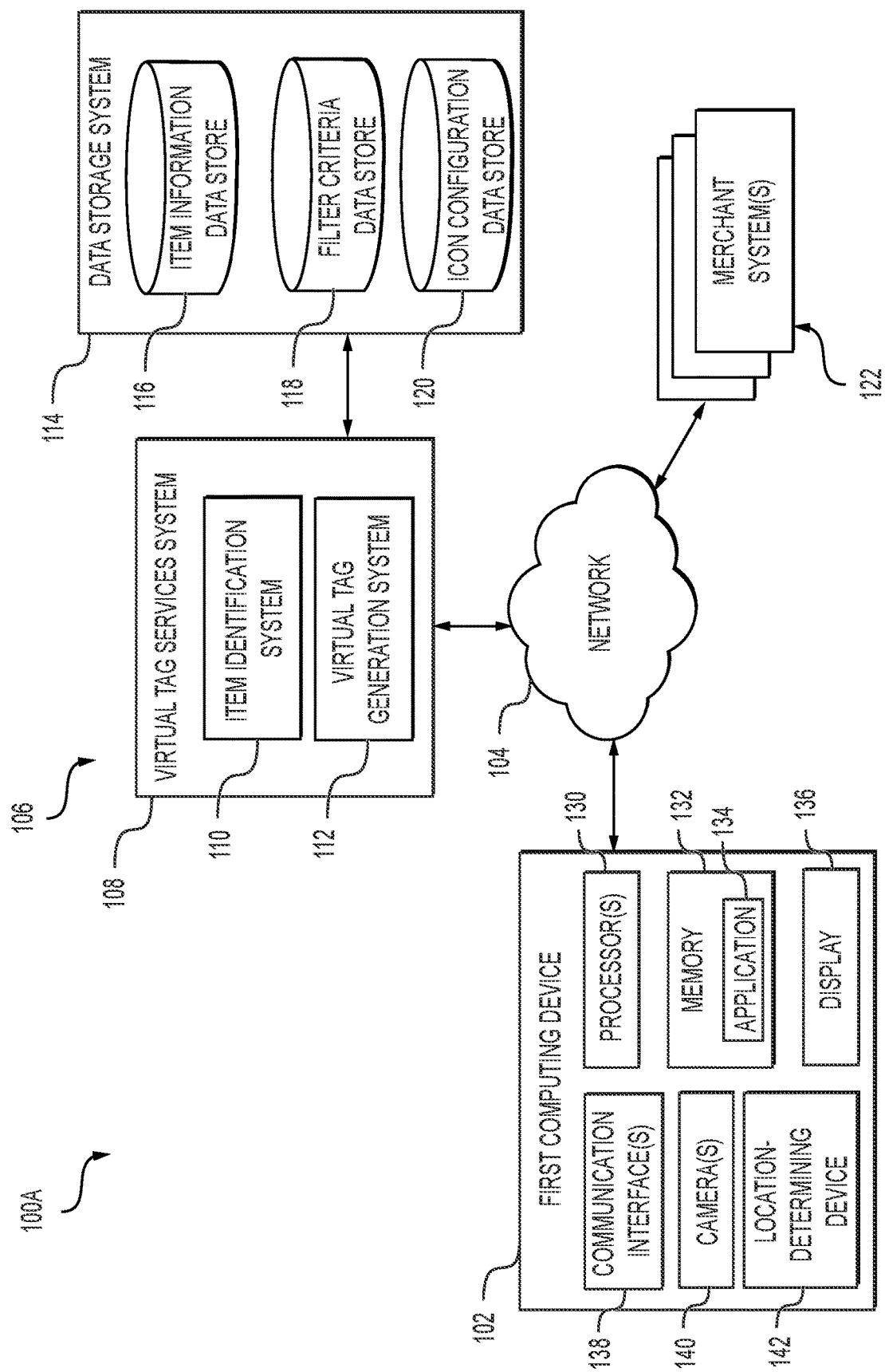
FIGS. 1A-1C depict exemplary environments for generating virtual tags for items in a physical environment, according to certain embodiments.

According to certain aspects of the disclosure, methods and systems are disclosed for generating virtual tags for items. As will be discussed in more detail below, in various embodiments, systems and methods are described for generating virtual tags for items that are located within a physical environment, such as a physical store, warehouse, or other similar site of a merchant or retailer. For example, the physical environment may include a plurality of items, where each item may include a plurality of attributes. A computing device of a user located within the physical environment may capture an image of the physical environment and display the image on a user interface of the computing device. The image may be processed to identify one or more of the plurality of items present in the image, and virtual tags may be generated for the items identified. The virtual tags may convey information about the items, including at least a portion of the attributes of the items. A spatial location of the items in the image may be identified, and the virtual tags for the items may be rendered for display on the user interface of the computing device in association with the spatial location of the items in the image.

Reference to any particular activity is provided in this disclosure only for convenience and is not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Similarly, the term "or" is intended to mean "and/or," unless explicitly stated otherwise.

Terms like "provider," "merchant," or the like generally encompass an entity or person involved in manufacturing, providing, selling, and/or renting items to persons such as a seller, dealer, renter, vendor, retailer or the like, as well as an agent or intermediary of such an entity or person. A "physical environment" generally encompasses any physical space, such as a store, building, warehouse, or other physical site, that is associated with a merchant and houses items, where the space is used to, e.g., make the items available for physical viewing and purchase to customers. An "item" generally encompasses a good, service, or the like having ownership or other rights that may be transferred, where an item may include a plurality of attributes that may be used by a customer to filter for specific items when browsing and/or to otherwise make purchase decisions. As used herein, terms like "customer" "user" or "individual" generally encompass any person or entity that may enter a physical environment of a merchant to browse and/or purchase items, and may consume virtual tag services from a provider (e.g., through an application on a computing device of the user). The term "virtual tag", as used herein, may include an icon for an item identified within an image of a physical environment that is displayed in association with a spatial location of the item in the image, where the icon indicates at least one attribute of the item and may be interacted with (e.g., to display additional attributes of the item, favorite the item, purchase the item, etc.). The term "application" may be used interchangeably with other terms like "program," or the like, and generally encompasses software that is configured to interact with, modify, override, supplement, or operate in conjunction with other software.

As used herein, a "machine learning model" generally encompasses instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

In an exemplary use case, a user having at least one computing device, such as a mobile communication device (e.g., smart cell phone) or a wearable device (e.g., smart glasses), may enter a physical environment, such as a store, warehouse, or other similar site, that includes a plurality items. As one illustrative example, the user may enter a retail furniture store that includes a plurality of furniture items across a large showroom. Rather than the user having to expend the time and effort physically traveling across the showroom to each of the furniture items in order to read information on a physical tag attached to the item to obtain item information, an image of the physical environment may be captured and displayed by the user's computing device, and a virtual item tag for one or more of the plurality of items that are present in the image may be rendered for display in association with a spatial location of the items in the image to convey the item information to the user.

For example, the image may be processed using one or more trained machine learning models to identify the items that are present in the image, information for the items, including the attributes of the items, may be requested based on the identification, and virtual tags may be generated for the items to convey at least a portion of the information to the user. A spatial location of the items in the image may be identified, and the virtual tags for the items may be rendered for display by the computing device that captured and is displaying the image on the user interface. The virtual tags may be displayed on the user interface in association with the spatial location of the items in the image. For example, the virtual tags may be overlaid on the image within the user interface such that the virtual tags float or hover above or over the corresponding items. In some examples, the virtual tags may include configurable icons that indicate at least one attribute of the items.

In some embodiments, the items identified from the image processing may be filtered based on item filter criteria such that virtual tags are only generated and displayed for a portion of the identified items that match (or at least are not inconsistent with) the item filter criteria. The item filter criteria may include item attributes selected or otherwise indicated by the user via the computing device. Additionally or alternatively, the item filter criteria may include default criteria that is automatically applied based on a categorical type or a particular identity of the physical environment and/or a history of user-received input at the categorical type or particular identity of the physical environment, among other similar examples. Continuing with the illustrative example where the physical environment is the retail furniture store, item filter criteria input by the user via the computing device may include a recliner, a manufacturer, and a maximum price. Accordingly, although there may be dozens of furniture items identified within the image captured, including multiple recliners, only virtual tags may be generated and displayed in association with a portion of the recliners that are made by the manufacturer and have a price that is at or under the maximum price identified by the item filter criteria.

Additionally, the user may interact with the displayed virtual tags via the computing device. For example, the computing device may detect gestures of the user and perform actions corresponding to the gestures. Through gesturing, the user may cause additional item information to be displayed, as well as allow the user to favorite an item, add the item to a transaction, request assistance, and/or dismiss the item, among other examples. In some embodiments, the user may be enabled to incorporate and/or integrate an online shopping experience with the user's physical in-store shopping experience through interaction with the virtual tags.

Further, the virtual tags may be updated as the computing device is moved by the user to, e.g., scan the physical environment, resulting in a change to the image captured. For example, a location of the virtual tags for items that are still present but have now changed spatial location within the image may be updated, new virtual tags may be generated and displayed for new items identified to be present in the image, and virtual tags may be removed for items that are no longer present in the image.

The generation and display of virtual tags may reduce the physical and/or mental exhaustion traditionally resulting from the user self-filtering items via the examination of item information on physical tags scattered throughout the large space comprising the physical environment. Additionally, the virtual tags may lessen the likelihood of user disappointment that may occur when eyeing or becoming attached to an item before learning the price of the item is out of budget. By reducing these physical, mental, and/or emotional stresses, the user's experience may be improved and the user may be more likely to make a purchase or multiple purchases.

In addition to improving user experience, the above-described generation and display of the virtual tags may overcome the accessibility issues associated with physical tags to improve the shopping experience for customers with mobility, vision, and/or other impairments. For example, for customers with mobility and/or stamina limitations, travelling back and forth across a large store to read the information on each physical tag may be physically difficult or impossible. Additionally, the physical tags are often attached to the items such that they hang down (e.g., close to the ground) requiring the customer to further reach down to grab the physical tag. Instead, using the embodiments described herein, a customer may simply use their computing device to capture an image of the physical environment causing virtual tags to be rendered for display on the computing device for items that are identified in the image (and if filters are used only the items that are identified and meet the item filter criteria) without having to physically move around the store. Additionally, physical hand tags often include information about the items in small print. By instead rendering virtual tags for display on the customer's computing device, a customer having vision impairments may utilize accessibility features of their computing device to, e.g., increase a font size for information displayed in association with the virtual tags and/or utilize text-to-speech to have the information provided as audio output to the customer.

Further, the virtual tags may reduce channel hopping. For example, currently a customer may physically read a tag and then may take a picture and/or scan the tag to, e.g., record the item as a potential option if the item meets the needs of the customer. Using the embodiments described herein, the customer may simply use their computing device to interact with the virtual tags displayed thereon to read the information associated with the item and perform additional actions, such as favoriting the item or adding the item to a transaction, among other actions.

While the specific examples included throughout the present disclosure involve generation and display of virtual tags for furniture items within a physical, retail furniture store, it should be understood that techniques according to this disclosure may be adapted to other types of items and physical environments. For example, the techniques may be adapted to any physical environment that provides a large number of items for physical viewing and/or purchase, where the items may be differentiated by attributes, such as price, materials, quality of manufacture, etc., that may not be observable by merely looking at the item itself. For example, other physical environments in which the virtual tag services may be adapted to and applied may include clothing stores, grocery stores, car dealerships, specialty stores (e.g., sporting goods stores, plant nurseries, etc.), food courts or food halls, retail real estate, and/or other similar environments. It should also be understood that the examples above are illustrative only. The techniques and technologies of this disclosure may be adapted to any suitable activity.

Presented below are various aspects of machine learning techniques that may be adapted for identifying an item, including a first subset of attributes of the item, present in an image of a physical environment. As will be discussed in more detail below, the machine learning techniques may include one or more aspects according to this disclosure, e.g., a particular selection of training data, a particular training process for the machine learning system, operation of the machine learning system in conjunction with particular data, modification of such particular data by the machine learning system, etc., and/or other aspects that may be apparent to one of ordinary skill in the art based on this disclosure.

Figure 1B:
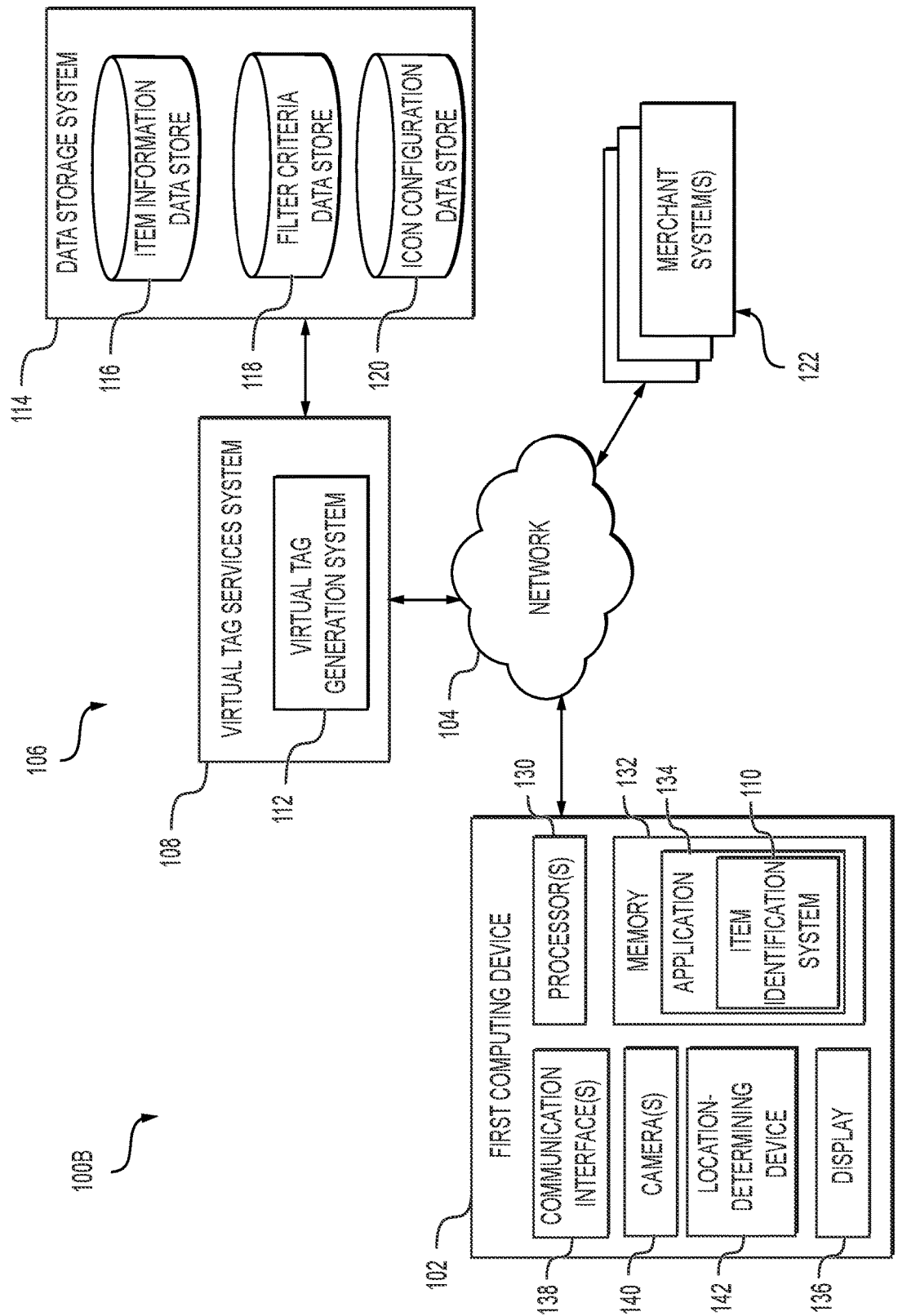
Figure 1C:
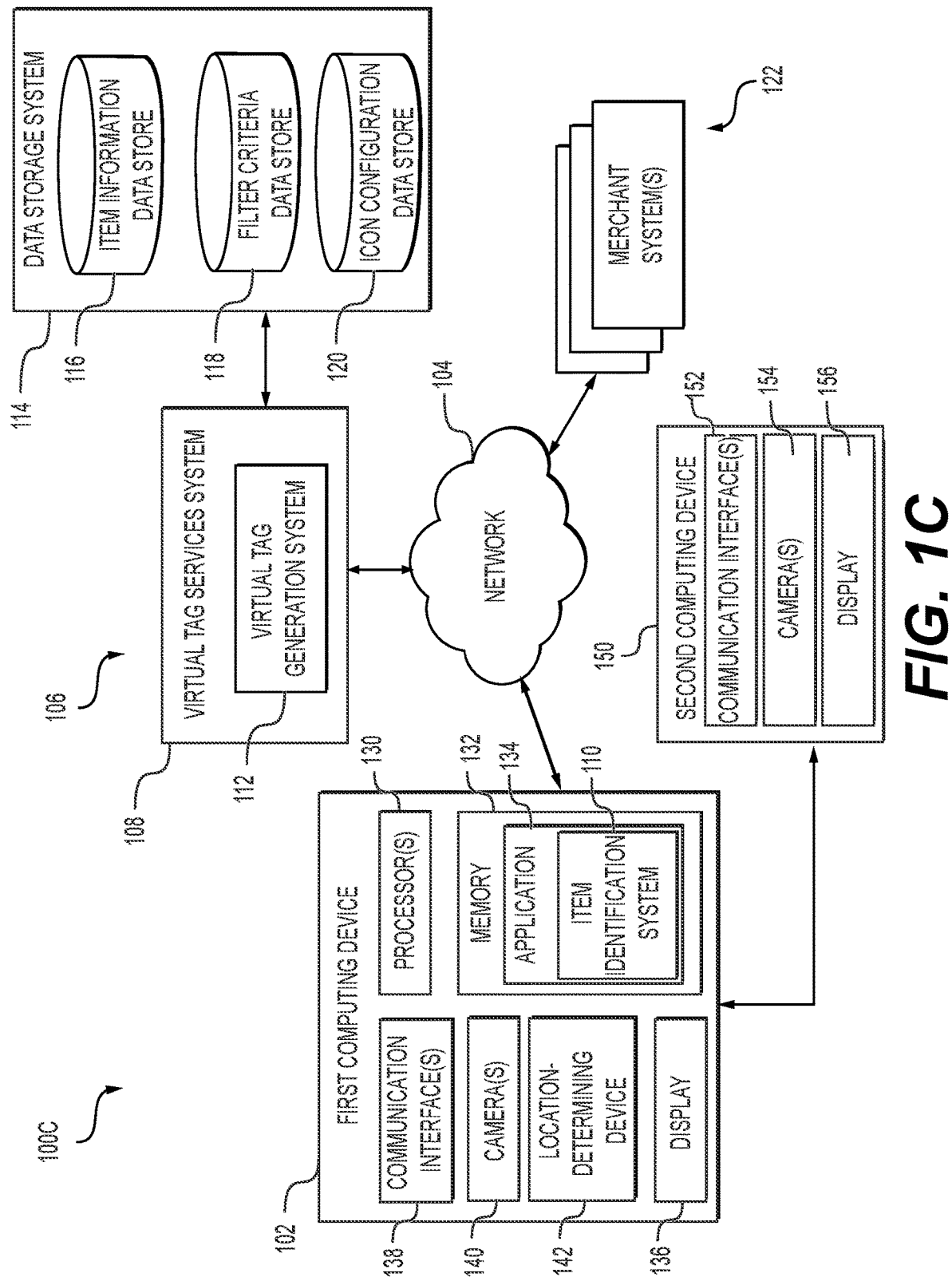

FIGS. 1A-1C depict exemplary environments 100A, 100B, 100C for generating virtual tags for items in a physical environment, according to certain embodiments, and which may be used with the techniques presented herein. In a first exemplary environment 100A depicted in FIG. 1A, a first computing device 102 located in a physical environment that includes a plurality of items may communicate with one or more of the other components of the environment 100A across electronic network 104, including one or more server-side systems 106 that may be associated with a provider, as discussed below. The first computing device 102 may be associated with a user that has entered the physical environment to browse and/or purchase one or more of the items. The user may also be consuming one or more services of the provider via the first computing device 102, including virtual tag services of the provider for generating virtual tags for the items in the physical environment.

The server-side systems 106 may include a virtual tag services system 108, referred to hereinafter as the system 108, and/or a data storage system 114, among other systems.

In some examples, the system 108 may include an item identification system 110 and a virtual tag generation system 112. In other examples, the operations of the item identification system 110 may be performed by another system or device, as shown and described with reference to FIGS. 1B and 1C below. The data storage system 114 may include one or more data stores, such as an item information data store 116, a filter criteria data store 118, and an icon configuration data store 120. In some examples, the system 108 and/or the data storage system 114 may each be systems of (e.g., hosted by) the provider. In such examples, the system 108 and/or data storage system 114 may be part of a cloud service computer system (e.g., in a data center). In other examples, the system 108, the data storage system 114, and/or components thereof may be systems of (e.g., hosted by) one or more third parties that provide services to the provider. For example, the item identification system 110 may be associated with a third party that provides item identification services to the provider, the virtual tag generation system 112 may be associated with a same or different third party that provides virtual tag generation services to the provider, and/or one or more of the data stores within the data storage system 114 may be associated with a same or different third party that provides data storage services to the provider.

One or more components of the server-side systems 106 may communicate with a plurality of merchant systems 122 over the network 104 to, e.g., collect item-related data. One or more of the merchant systems 122 may be associated with merchants that own, rent, or are otherwise affiliated with physical environments through which items are made available for physical viewing and purchase. Additionally or alternatively, one or more of the merchant systems 122 may be associated with merchants that manufacture and/or provide the items to the merchants affiliated with the physical environments. The merchant systems 122 may include one or more data stores that store information for the items associated with the respective merchant, referred to hereinafter as merchant data stores. In some examples, the server-side systems 106 may collect the item-related data from and/or send an information request to query one or more of the merchant data stores. In other examples, an application associated with the provider (e.g., application 134 described below) may be paired with an application of one or more of the merchants via an application programming interface to be able to access the data.

Additionally, in some examples, the provider may be an entity that also provides financial account services consumed by the user of the first computing device 102. In such examples, the system 108 may communicate with an account services system of the provider to retrieve account related information for display in conjunction with the virtual tags.

The systems and devices of the environment 100A may communicate in any arrangement. As will be discussed herein, systems and/or devices of the environment 100A may communicate in order to enable identification of items present in an image of the physical environment captured by the first computing device 102, and generation of virtual tags for one or more of the identified items that are rendered for display on the first computing device 102, among other activities.

The first computing device 102 may be configured to enable the user to access and/or interact with other systems in the environment 100A. The first computing device 102 may include a processor 130, a memory 132, a display 136, one or more communication interfaces 138, one or more cameras 140 and/or a location-determining device 142. The first computing device 102 may include any augmented reality (AR) capable computing device. For example, the first computing device 102 may be a mobile device, such as a cell phone, a wearable device (e.g., smart goggles or glasses, smart watches or bands, etc.), a tablet, a laptop computer, etc., a desktop computer, and/or the like.

In some embodiments, the first computing device 102 may include one or more electronic application(s), e.g., a program, plugin, browser extension, etc., installed on the memory 132 of the first computing device 102. In some embodiments, the electronic application(s) may be associated with one or more of the other components in the environment 100A. As shown in FIG. 1A, at least a portion of one or more instructions stored in the memory 132 of the first computing device 102 may be related to operations of an application 134 associated with the provider that is configured to communicate with one or more of the server-side systems 106. For example, the application 134 may be executed on the first computing device 102 to provide image data and/or location data, described below, to the server-side systems 106 to enable identification of one or more of the items present in the image captured of the physical environment and generation of virtual tags for one or more of the identified items. Instructions may then be provided from the server-side systems 106 to the application 134 to enable the virtual tags to be rendered for display on the first computing device 102. In some examples, the application 134 may be a thick client application that is installed locally on the first computing device 102. In other examples, the application 134 may be a thin client application (e.g., a web application) that is rendered via a web browser launched on the first computing device 102. In further examples, the application 134 may be a web browser extension application that adds functionality, such as virtual tag functionality, to a web browser launched on the first computing device 102.

One or more components of the first computing device 102 may generate, or may cause to be generated, one or more graphical user interfaces (GUIs) based on instructions/information stored in the memory 132, instructions/information received from one or more of the server-side systems 106, and/or the like and may cause the GUIs to be displayed via the display 136. The GUIs may be, e.g., mobile application interfaces or browser user interfaces and may include text, input text boxes, selection controls, and/or the like. The display 136 may include a touch screen or a display with other input systems (e.g., a mouse, keyboard, voice, etc.) for an operator of the first computing device 102 to control the functions of the first computing device 102. The communication interface(s) 138 may be a transmission control protocol/Internet protocol (TCP/IP) communication interface, or another type of wired or wireless communication interface, for Ethernet or wireless communications with the server-side systems 106 via the network 104.

The one or more cameras 140 may be configured to capture an image of the physical environment in which the first computing device 102 is located. The image captured may be a live image in which a plurality of image frames are captured. In other examples, the image captured may be a still image. One or more of the items included within the physical environment may be captured (e.g., may be present) at a given spatial location within an image frame when the items are in a field of view of the cameras 140. In some examples, the user may move the first computing device 102 to, e.g., scan the physical environment, and thus the field of view of the cameras 140 may be correspondingly changed. Resultantly, the items and/or an associated spatial location of the items captured within the initial image frame may change. The image captured may be displayed on the display 136 such that the image is viewable to the user. Additionally, the image may be livestreamed over the network 104 (e.g., via application 134) to one or more of the server-side systems 106, such as the item identification system 110 of the system 108.

The location-determining device 142 may be configured to determine the location of the first computing device 102. In some embodiments, the location determining device 42 uses one or more of Global Positioning System (GPS) technology (which may receive GPS signals), Global Navigation Satellite System (GLONASS), cellular triangulation technology, network-based location identification technology, Wi-Fi positioning systems technology, and/or combinations thereof to determine the location of the first computing device 102.

The item identification system 110 may include one or more server devices (or other similar computing devices) for executing item identification services of the provider. As described in detail elsewhere herein, example item identification services may include image processing to identify one or more items present in an image of the physical environment that includes the plurality of items. The image may be captured by the one or more cameras 140 of the first computing device 102 and provided to the item identification system 110 over the network 104 via the application 134 (e.g., the image may be livestreamed). Additionally, the location of the first computing device 102 determined by the location-determining device 142 may be provided to facilitate the item identification. One or more trained machine learning models may be deployed to process the image to perform the item identification. In some examples, the machine learning models may be trained by the item identification system 110 and stored in a data store of the item identification system 110 and/or the data storage system 114. Additionally, different machine learning models may be trained for different types of items associated with different types of merchants (e.g., a first machine learning model trained to identify furniture items, a second machine learning item trained to identify clothing items, and so on). In other examples, one or more of the machine learning models may be trained by a third party, and provided to the item identification system 110 for storage and deployment. For example, one or more of the machine learning models may be trained by a respective merchant system (e.g., of the merchant systems 122) to identify merchant-specific items. In some examples, the item identification services may further include determining a spatial location of the items identified in the image by the trained machine learning models.

The virtual tag generation system 112 may include one or more server devices (or other similar computing devices) for executing virtual tag generation services. As described elsewhere herein, example virtual tag generation services may include requesting information for the items identified by the item identification system 110 from a data store, generating icons for the items based on (e.g., to include) at least a portion of the information received responsive to the request, and providing instructions for rendering the icons for display to the first computing device 102 (e.g., via the application 134). The data store from which the information is requested may include the item information data store 116 described below and/or one or more of the merchant data stores of merchant systems 122. In some embodiments, only information may be requested for and/or icons may only be generated for a subset of the items identified based on item filter criteria (e.g., received from filter criteria data store 118 described below). Additionally, when generating the icons for the items, configurations of the icons may be tailored based on preferences of a merchant associated with the respective item and/or based on preferences of the user of the first computing device 102 (e.g., received from icon configuration data store 120).

When the instructions are executed by the first computing device 102, the icons for the items may be rendered for display on the display 136 of the first computing device 102 in association with the spatial location of the items in the image. For example, the icons may be overlaid on the image of the physical environment displayed on the display 136 of the first computing device 102 such that the icons for the items float and/or hover above or over the corresponding items within the image. The icons may be interacted with by the user via the display 136 and/or the icons may be updated as the image captured by the cameras 140 of the first computing device 102 changes.

The data storage system 114 may include a server system or computer-readable memory such as a hard drive, flash drive, disk, etc. In some embodiments, the data storage system 114 includes and/or interacts with an application programming interface for exchanging data to other systems, e.g., one or more of the other components of the environment, such as at least the item identification system 110 and the virtual tag generation system 112. In some examples, the data storage system 114 may be a sub-system or component of the system 108, along with the item identification system 110 and the virtual tag generation system 112. The data storage system 114 may include and/or act as a repository or source for various types of item and/or virtual tag-related data.

For example, the item information data store 116 may be a data store that acts as a central repository and/or a central database configured to store item information data for a plurality of items associated with a plurality of merchants that are collected from third party systems. The item information data for each item may be stored in association with at least an identifier of the item. In some examples, the item information data for each item may also be stored in association with a merchant of the item. For a given item, the item information data may include a plurality of attributes associated with the item. In some examples, the third party systems from which the item information data is collected may include the merchant systems 122. In other examples, the third party systems may include systems comprising crowdsourced data. The item information may be periodically collected from the third party systems to update the item information data stored in item information data store 116. Additionally or alternatively, rather than collecting, storing, and updating the information stored within the item information data store 116, the item information may be requested directly from the merchant data stores of the merchant systems 122 and/or accessible via the pairing of the application 134 to the merchant applications.

The filter criteria data store 118 may be configured to store default item filter criteria. The default item filter criteria may be applied alone or, if received, in addition to one or more other item filter criteria input to the first computing device 102 to limit the item information requested for and/or icons generated to only those items identified in the image that match the item filter criteria. As described in more detail elsewhere herein, the default item filter criteria may be based on a type or an identity of the physical environment that is determined based location data of the first computing device 102 and/or a history of one or more item filter criteria input to the first computing device 102 at the type or the identity of the physical environment. Accordingly, any new item filter criteria received as input to the first computing device 102 may be stored in association with the type or the identity of the physical environment to adjust and/or modify the default item filter criteria for future applications.

The icon configuration data store 120 may include icon configuration data that may be retrieved to generate one or more icons for an item. The icon configuration data may specify at least one attribute of the item that the icon is to be indicative of. As described in more detail elsewhere herein, the icon configuration data may include preferences associated with the merchant of the item, such as the inclusion of user interface elements provided by the merchant (e.g., via merchant systems 122) that match a brand of the merchant, and/or preferences of the user associated with the first computing device 102.

The network 104 over which the one or more components of the environment 100A communicate may include one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 104 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. The first computing device 102 and one or more of the server-side systems 106 may be connected via the network 104, using one or more standard communication protocols. The first computing device 102 and the one or more of the server-side systems 106 may transmit and receive communications from each other across the network 104, as discussed in more detail below.

Although depicted as separate components in FIG. 1A, it should be understood that a component or portion of a component in the system of the environment 100A may, in some embodiments, be integrated with or incorporated into one or more other components. For example, the virtual tag generation system 112 and/or data storage system 114 may be integrated with the item identification system 110 in system 108 or the like. In some embodiments, operations or aspects of one or more of the components discussed above may be distributed amongst one or more other components. Any suitable arrangement and/or integration of the various systems and devices of the environment 100A may be used.

FIG. 1B depicts a second exemplary environment 100B for generating the virtual tags for the items in the physical environment. The environment 100B is the same as the environment 100A described with reference to FIG. 1A above, except for the operations of the item identification system 110 are performed by the application 134 executing on the first computing device 102. That is, rather than the first computing device 102 transmitting (e.g., livestreaming) the image captured by the cameras 140 over the network 104 to the system 108 for remote processing, the application 134 may run the one or more trained machine learning models locally to identify the items present in the image. The output of the trained machine learning models, along with other data, may then be transmitted over the network 104 (e.g., via the application 134) to the virtual tag generation system 112 of the system 108 for performing the virtual tag generation services described with reference to FIG. 1A. By performing the operations of the item identification system 110 locally on the first computing device 102 that captures the image, latency may be decreased and network resources that would otherwise be consumed by livestreaming the image for remote processing may be conserved.

FIG. 1C depicts a third exemplary environment 100C for generating the virtual tags for the one or more items in the physical environment. The environment 100C is the same as the environment 100A described with reference to FIG. 1A above, except for the operations of the item identification system 110 are performed by the application 134 executing on the first computing device 102 (similar to the environment 1008) and the environment 100C includes a second computing device 150 associated with the user and located in the physical environment.

The second computing device 150 may include one or more communication interfaces 152, one or more cameras 154 and/or a display 156, among other components, similar to the first computing device 102. The second computing device 150 may include any augmented reality (AR) capable computing device that can be communicatively coupled to the first computing device 102. In some examples, the first computing device 102 may have greater processing power and/or processing capabilities than the second computing device 150. As one non-limiting example, the first computing device 102 may be a mobile communication device, such as a smart phone, and the second computing device 150 may be a wearable device, such as a pair of smart glasses, that is communicatively coupled to (e.g., paired with) the smart phone. In some examples, the first computing device 102 and the second computing device 150 may be communicatively coupled over the network 104 or a different network. The communication interface(s) 152 may be a transmission control protocol/Internet protocol (TCP/IP) communication interface, or another type of wired or wireless communication interface, for Ethernet or wireless communications with the first computing device 102 via the network 104 or the different network.

The one or more cameras 154 of the other computing device (rather than the cameras 140 of the first computing device 102) may be configured to capture the image of the physical environment and display the image on the display 156 such that the image is viewable to the user. The image may be transmitted (e.g., livestreamed) to the first computing device 102 that is communicatively coupled to the second computing device 150. The application 134 executing on the first computing device 102 may perform the operations of the item identification system 110 locally, including running the one or more trained machine learning models locally, to identify the items present in the image. The output of the trained machine learning models, along with other data, may then be transmitted over the network 104 (e.g., via the application 134) to the virtual tag generation system 112 of the system 108 for performing the virtual tag generation services described with reference to FIG. 1A. The instructions for rendering the icons for display may be provided to the first computing device 102 via the application 134 and further transmitted to the second computing device 150 to enable the icons to be rendered by the second computing device 150 on the display 156.

One or more components of the second computing device 150 may generate, or may cause to be generated, one or more graphical user interfaces (GUIs) based on instructions/information stored locally, instructions/information received from the first computing device 102, and/or the like and may cause the GUIs to be displayed via the display 156. The GUIs may be, e.g., mobile application interfaces or browser user interfaces and may include text, input text boxes, selection controls, and/or the like. The display 156 may include a touch screen or a display with other input systems (e.g., a mouse, keyboard, voice etc.) for an operator of the first computing device 102 to control the functions of the first computing device 102.

In the following disclosure, various acts may be described as performed or executed by a component from FIGS. 1A-1C, such as the first computing device 102, the second computing device 150, the one or more of the server-side systems 106, or components thereof. However, it should be understood that in various embodiments, various components of the exemplary environments 100A, 1008, and 100C discussed above may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

Figure 2:
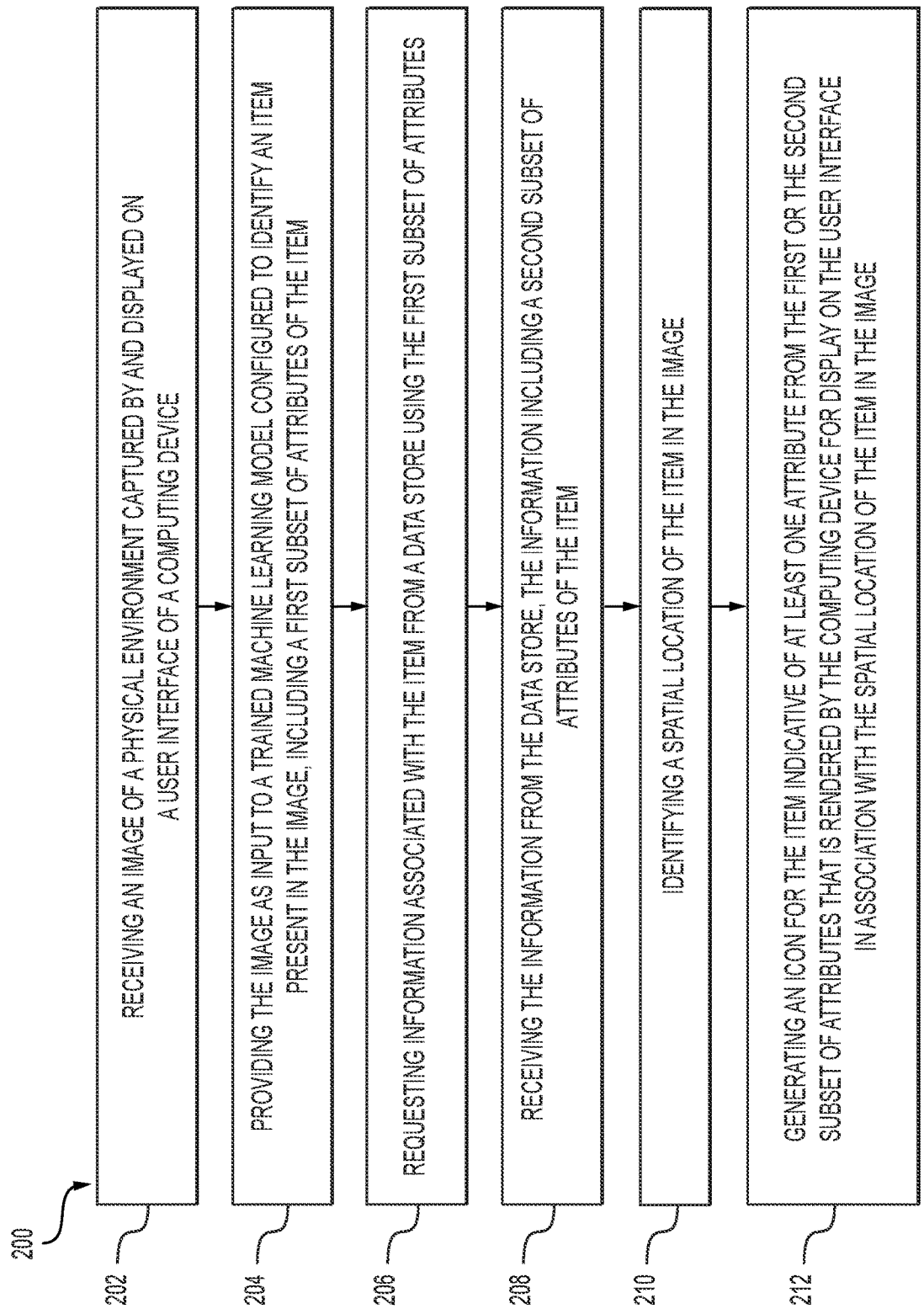
FIG. 2 depicts a flowchart of an exemplary process for generating a virtual tag for an item in a physical environment, according to certain embodiments.

FIG. 2 depicts a flowchart of an exemplary process 200 for generating a virtual tag for an item in a physical environment, according to certain embodiments. At step 202, the process 200 may include receiving an image of the physical environment captured by and displayed on a user interface of a computing device, such as the first computing device 102 or the second computing device 150. The physical environment may include a plurality of items. Each of the items may include a plurality of attributes. Exemplary attributes may include an identifier, an associated merchant, a name, a price, a size, a color, a material, an accessory, a description, a review, and/or an availability of the item, among other attributes that are descriptive of or characterize the item.

In the environment 100A described with reference to FIG. 1A, the item identification system 110 executing on a remote server device of system 108 may receive the image from the first computing device 102 (e.g., via the application 134), where the first computing device 102 captured the image using the one or more cameras 140 and displayed the image on the user interface via the display 136. In the environment 100B described with reference to FIG. 1B, the application 134 executing on the first computing device 102 and performing the operations of the item identification system 110 locally may receive the image that is captured by the cameras 140 and displayed on the user interface via the display 136. In the environment 100C described with reference to FIG. 1C, the application 134 executing on the first computing device 102 and performing the operations of the item identification system 110 locally may receive the image from the second computing device 150, where the second computing device 150 captured the image using the one or more cameras 154 and displayed the image on the user interface via the display 156. The image captured by the first computing device 102 or the second computing device 150 may be a live image of the physical environment comprised of a plurality of image frames.

At step 204, the process 200 may include providing the image as input to a trained machine learning model configured to identify an item (e.g., one of the plurality of items included in the physical environment) present in the image, including a first subset of attributes of the item. In some examples, the first subset of attributes identified may include at least the identifier of the item (e.g., a universal product code (UPC), a model number, or other similar identifying information). In some examples, the first subset of attributes may also include a merchant (e.g., a manufacturer or producer) associated with the item.

In the environment 100A described with reference to FIG. 1A, the trained machine learning model may be run by the item identification system 110 that is executing on the remote server device of system 108. In the environments 100B and 100C described with reference to FIG. 1B and FIG. 1C, respectively, the trained machine learning model may be run by the application 134 performing the operations of the item identification system 110 locally on the first computing device 102, and the item, including the first subset of attributes of the item identified, may be transmitted to the system 108 (e.g., via the application 134).

As previously discussed, the image received, and thus the image provided as input to the trained machine learning model may be a live image comprised of a plurality of image frames. In some examples, each image frame of the plurality of image frames may be provided as input to the trained machine learning model. However, processing each frame requires an exorbitant amount of data processing resources, and there is typically a large amount of similarity between frames causing the output gained to be less valuable than the resources being consumed. Therefore, in other examples, to conserve data processing resources, only a portion of the plurality of image frames may be provided as input to the trained machine learning model to be processed. In one example, the item identification system 110 may monitor for changes between consecutive image frames (e.g., a first image frame and a second image frame, a second image frame and a third image frame, and so on). When a change between consecutive image frames is detected that is above a predefined threshold, the latter frame may be provided as input to the trained machine learning model for processing.

In some examples, the trained machine learning model to which the image is provided may be selected from a plurality of trained machine learning models based on a type of the physical environment (e.g., based on a type of items offered for sale by the merchant). For example, if the physical environment is determined to be a retail furniture store, a machine learning model trained to identify furniture items may be selected, whereas if the physical environment is determined to be a retail clothing store, a machine learning model trained to identify clothing items may be selected. The type of the physical environment may be determined based on a location of the first computing device 102 and/or the second computing device 150. For example, if the computing device location indicates a set of coordinates that are known to be associated with a physical store of a particular merchant that is known to offer for sale items of a given type, the trained machine learning model corresponding to the type may be applied.

In other examples, the trained machine learning model to which the image is provided may be a merchant-specific model that is, e.g., trained by a given merchant to identify items (e.g., by learning designs and/or styles) that are specific to that merchant. For example, a merchant that owns, rents, or is otherwise affiliated with the physical environment may be identified, and if available, a machine learning model trained by that merchant may be applied. The merchant affiliated with the physical environment may be identified based on a location of the first computing device 102 and/or the second computing device 150. For example, if the computing device location indicates a set of coordinates that are known to be associated with a physical store of a particular merchant, the trained machine learning model specific to and trained by the particular merchant may be applied.

In further examples, the image may be provided to more than one trained machine learning model that is merchant-specific based on items that are known or at least likely to be included in the physical environment. The trained machine learning models may be run in parallel or serially. The models may be a subset selected from a plurality of trained machine learning models based on a type (e.g., a category) or identity of the physical environment determined. For example, retail furniture stores often offer for sale furniture items from different manufacturers (e.g., recliners from manufacturer A, manufacturer B, and/or manufacturer C). Therefore, if the physical environment is categorically determined to be a retail furniture store, a subset of trained machine learning models that are available from manufacturers of furniture items (e.g., received from merchant systems 122) may be selected. As another example, if the physical environment is determined to be a particular furniture retail store and inventory data for the particular furniture retail store is available, trained machine learning models available from manufacturers of furniture items included in the inventory data may be selected.

In some examples, location-based techniques may be used in conjunction with the trained machine learning model to identify the item. For example, a location of the first computing device 102 (and/or the second computing device 150) determined using one or more of Global Positioning System (GPS) technology (which may receive GPS signals), Global Navigation Satellite System (GLONASS), cellular triangulation technology, network-based location identification technology, Wi-Fi positioning systems technology, and/or combinations thereof, in conjunction with other collected data may facilitate identification of the item. The other collected data may include data associated with the physical environment, such as an inventory map of the physical environment that indicates which items are present at various locations within the physical environment. Additionally or alternatively, the collected data may include crowd-sourced data from computing devices of other users recorded when they are located in the physical environment (e.g., via applications associated with the provider similar to the application 134 that are executing on the computing devices of the other users). For example, one of the other users may provide input to the application to indicate that a first item is at a first location in the physical environment. This input may be collected and stored by the item identification system 110 to help facilitate future item identifications. For example, the next time an image of the physical environment is received and the location of the first computing device 102 and/or the second computing device 150 corresponds to the first location, at least one of the items identified may be confirmed as the first item.

Additionally or alternatively, spatial recognition may be used in conjunction with the trained machine learning model to identify the item within the physical environment. For example, spatial relationships among items may be determined from collected data, including inventory map data for the physical environment and/or crowdsourced data, described above. As one illustrative example, a first item may be determined to be at a spatial location adjacent to a spatial location of the second item. Therefore, if the first item is identified within an image that also includes the second item, the second item may be identified within the image based on its known spatial relationship to the first item in addition to or separately from the identification of the second item by the trained machine learning model.

At step 206, the process 200 may include requesting information associated with the item from a data store using the first subset of attributes to indicate the item for which the information is requested. In some examples, the virtual tag generation system 112 may perform step 206. For example, the virtual tag generation system 112 may receive a virtual tag request for the identified item that includes the first subset of attributes from the item identification system 110 request. At least an identifier of the item included in the first subset of the plurality of attributes may be provided as part of the information request to the data store to indicate the item for which the information is request (e.g., to serve as query parameters that are provided to the data store).

The request may be in a form of an application programming interface (API) request. In some examples, the API request may be provided to a central database of the provider of the virtual tag services, such as the item information data store 116, that is configured to store information for a plurality of items collected from each of a plurality of merchants (e.g., collected from merchant system 122). In other examples, a merchant associated with the item may be identified (e.g., a merchant affiliated with the physical environment and/or a merchant that manufactures or provides the item to the merchant affiliated with the physical environment), and an API request may be sent to one of the merchant systems 122 of the merchant for querying one or more merchant data stores thereof.

At step 208, the process 200 may include receiving the information from the data store. The information may include a second subset of the plurality of attributes of the item. The second subset of the plurality of attributes may include at least one or more additional attributes that were not identified by the trained machine learning model in the first subset of attributes. The virtual tag generation system 112 that requested the information at step 206 may receive the information at step 210.

At step 210, the process 200 may include identifying a spatial location of the item in the image. For example, a pixel coordinate of the image corresponding to a predefined point of the item, such as a central point of the item, may be identified as the spatial location of the item in the image. In some examples, the item identification system 110 may perform step 210. In embodiments where the operations of the item identification system 110 are performed locally on the first computing device 102, the spatial location of the item may be identified and provided to the virtual tag generation system 112 as part of the virtual tag request discussed above with reference to step 206.

Figure 6:
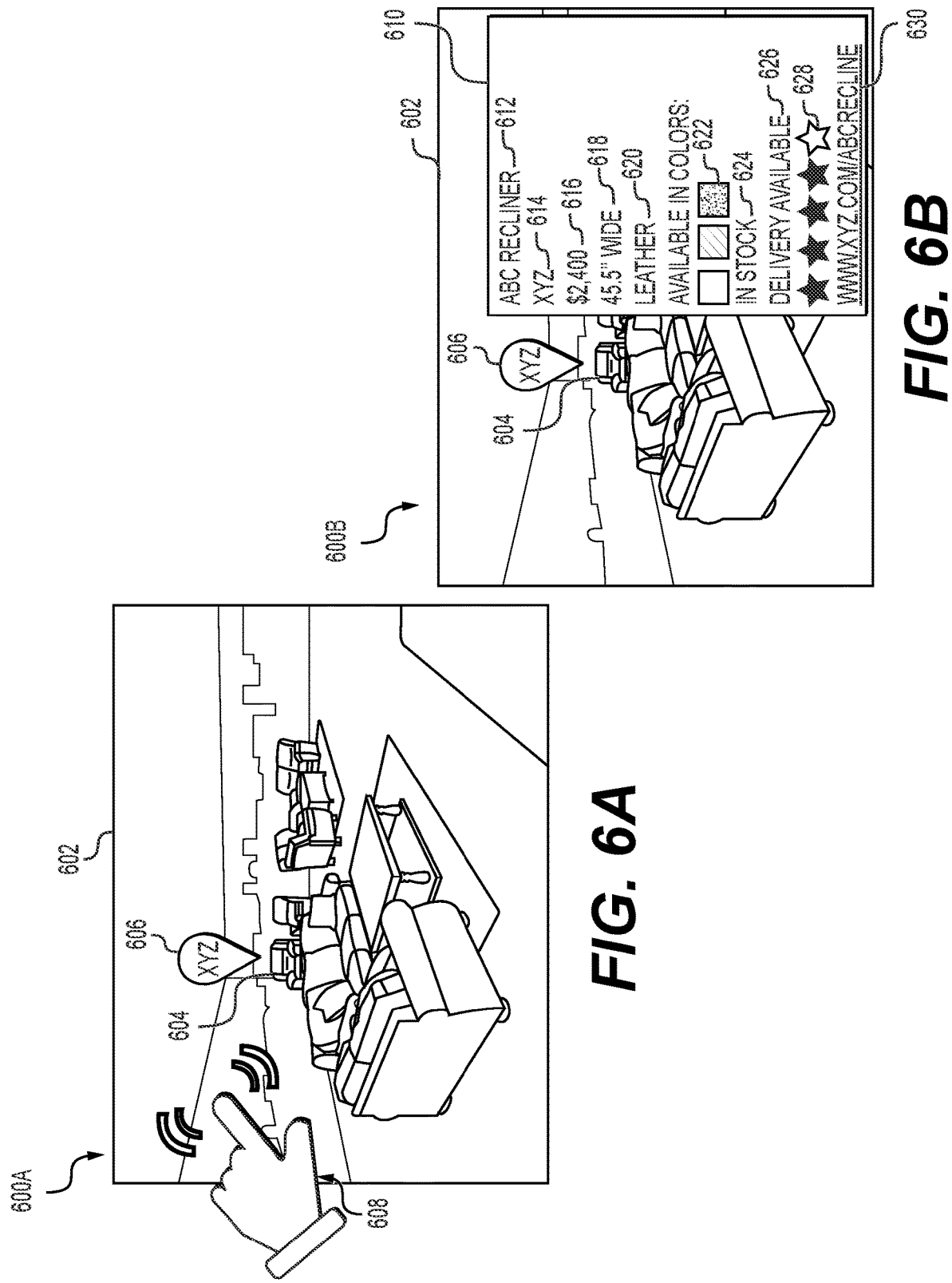
FIGS. 6A and 6B depict exemplary user interfaces on which a virtual tag for an item is displayed, according to certain embodiments.

At step 212, the process 200 may include generating an icon for the item. The icon may be indicative of at least one attribute from the first subset or the second subset of attributes for the item. The icon may be rendered for display by the computing device that captured and displayed the image of the physical environment on the user interface, such that the icon is overlaid on the displayed image of the physical environment on the user interface. For example, the first computing device 102 may render the icon for display in the environments 100A and 1008, and the second computing device 150 may render the icon for display in the environment 100C. The icon may be rendered for display on the user interface in association with the spatial location of the item in the image such that the icon for the item is positioned above or over the item in the image (e.g., at or near the pixel coordinate of the image corresponding to a predefined point of the item). For example, the icon may appear to float and/or hover above or over the item in the image. The icon may be a virtual tag for the item that conveys information about the item to the user without the user having to travel to the item and inspect a physical tag attached to the item. An exemplary icon is shown in FIG. 6A.

Generation of the icon may include determining a configuration of the icon. The configuration may specify the at least one attribute for which the icon is indicative of. In some examples, the configuration of the icon may be tailored based on one or more preferences of the user of the first computing device 102 and/or the second computing device 150 that are received from the icon configuration data store 120. As one example, the user may prefer the icon to indicate an associated merchant (e.g., the manufacturer) of the item, and the icon may include a graphical symbol or logo for the merchant (e.g., part of the merchant's brand). As another example, the user may prefer the icon to be indicative of a price of the item, and the icon may either include the numerical price and/or a visualization scheme indicating a range in which the price falls. Example visualization schemes may include a number of symbols to reflect low to high price range (e.g., $, $$, $$$, etc.) or a color scheme whereby different colors represent different price ranges, among other similar examples.

Additionally or alternatively, the configuration of the icon may be tailored based on one or more preferences of a merchant associated with the item that are received from the icon configuration data store 120. For example, the merchant may prefer particular symbols and/or logos to be used in the icon to indicate the merchant, along with other similar style elements of the icon to, e.g., match the style or the aesthetic of the merchant's brand. In some examples, to facilitate style matching, the merchant may allow the virtual tag generation system 112 to pair with or other have access to an application of the merchant such that at least portions of user interfaces created by the merchant may be utilized by the virtual tag generation system 112 in generating the icon.

To enable the icon to be rendered for display, the virtual tag generation system 112 may provide instructions that may be received and executed by the first computing device 102 or the second computing device 150 to cause the icon to be displayed. The instructions may include the spatial location of the item in the image (e.g., the pixel coordinate of the image corresponding to the predefined point of the item). Additionally, the instructions may include at least a portion of the information requested that may, e.g., be displayed when the icon is interacted with. Once an icon is displayed, the icon may be interacted with by the user through gesturing and/or updated based on changes to the image captured, as discussed in detail with reference to FIG. 4. The instructions may be stored in a cache of the respective first computing device 102 or the second computing device 150 to decrease latency in the display of the icon and/or other information when the icon is interacted with and/or updated.

For simplicity and clarity purposes, the process 200 describes the identification and generation of a virtual tag for one item. However, often there may be multiple items present in the image, particularly when the physical environment is a large retail store housing hundreds to thousands of items. In such examples, the trained machine learning model may identify each of the items present in the image via a single run of the model at step 204. Steps 206-212 of the process 200 may then be performed in parallel or serially for each of the items identified within the image of the physical environment such that an icon corresponding to each of the one or more items may be rendered by the computing device for display on the user interface in association with a spatial location of the respective item in the image. In other examples, and as discussed in detail with reference to FIG. 3 below, icons may only be generated for a subset of one or more items identified in the image of the physical environment based on item filter criteria.

Accordingly, certain embodiments may include generation of a virtual tag for an item in a physical environment. The process 200 described above is provided merely as an example, and may include additional, fewer, different, or differently arranged steps than depicted in FIG. 2.

Figure 3:
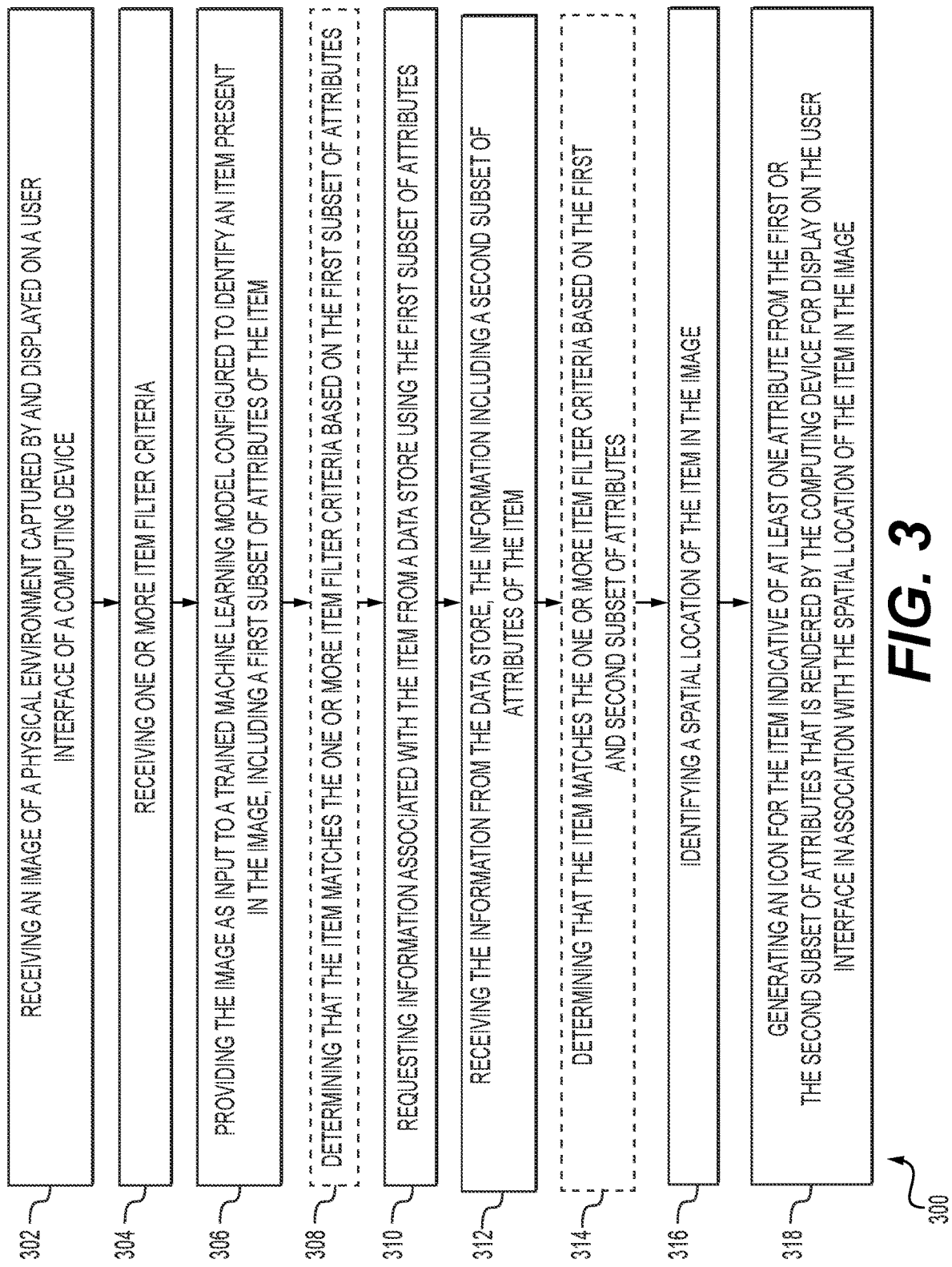
FIG. 3 depicts a flowchart of an exemplary process for generating a virtual tag for an item in a physical environment based on item filter criteria, according to certain embodiments.

FIG. 3 depicts a flowchart of an exemplary process 300 for generating a virtual tag for an item in a physical environment based on item filter criteria, according to certain embodiments. The process 300 may be similar to the process 200 described above with reference to FIG. 2, except for item filter criteria may be applied to the item at one or more additional steps (e.g., at optional steps 308 and/or 314) during the process 300 such that a virtual tag is only generated for the item if the item matches, or at least is not inconsistent with, the item filter criteria.

At step 302, the process 300 may include receiving an image of a physical environment captured by and displayed on a user interface of a computing device, where the physical environment includes a plurality of items. This step 302 may be the same or similar to step 202 of the process 200, described above in detail with reference to FIG. 2.

In addition to the image, one or more item filter criteria may be received at step 304. The item filter criteria may be associated with item attributes. In some examples, the item filter criteria may be item attributes that were received as input to the first computing device 102 and/or the second computing device 150. For example, the user may input the item filter criteria using touch and/or voice interfaces of the first computing device 102 and/or the second computing device 150. In some examples, the first computing device 102 and/or the second computing device 150 may provide a list of item filter criteria corresponding to item attributes that the user may select from using voice, touch, and/or gesture.

Additionally or alternatively, the item filter criteria may be default item filter criteria associated with item attributes. The default item filter criteria may be received from the filter criteria data store 118, and automatically applied (e.g., without any prompting or input from the user of the first computing device 102 and/or the second computing device 150). In some examples, the default item criteria may be based on a type or an identity of the physical environment determined based on the location of the first computing device 102 and/or the second computing device 150. For example, if the physical environment is a retail store, the default criteria may be dependent on the category of retail store (e.g., furniture vs. grocery vs. clothing, etc.) and/or the particular retail store (e.g., bargain clothing store vs. designer clothing store). As one non-limiting example, the default item filter criteria for a furniture store may have a price attribute range that is significantly higher than a price attribute range for a grocery store (e.g., items under $2,000 vs. items under $20). The type and/or the identity of the retail store may be determined based on the location of the first computing device 102 and/or the second computing device 150.

In some examples, the default item criteria may be more specifically tailored to the user and may be based on a history of one or more item filter criteria input to the first computing device 102 and/or the second computing device 150 at the type or the identity of the physical environment. For example, if the physical environment is determined to be a particular clothing retail store, and in the past, the user has input filter item criteria of a size medium to the first computing device 102 and/or the second computing device 150 when at other clothing retail stores and/or this particular clothing store, the default item criteria applied may include a size attribute of medium.

At step 306, the process 300 may include providing the image as input to a trained machine learning model configured to identify an item present in the image, including a first subset of attributes of the item. This step 306 may be the same or similar to step 204 of the process 200, described above in detail with reference to FIG. 2.

At optional step 308, the process 300 may include determining that the item matches (or at least is not inconsistent with) the one or more item filter criteria based on the first subset of attributes, and the process 300 may proceed to step 310 to perform an information request. For example, when the physical environment is a retail furniture store, one of the item filter criteria may include a type of item, such as a recliner, and one of the attributes in the first subset identified by the trained machine learning model may include an identifier and/or a name associated with the item that indicates the item is indeed a recliner, and thus matches the item filter criteria.

On the other hand, if one of the first subset of attributes indicated that the item was a sofa, for example, then a mismatch between the item and the item filter criteria may have been determined and no further processing related to the item may occur. Resultantly, this front end filtering may conserve resources by limiting information requests to only items that match or at least not inconsistent with the item filter criteria based at least on the first subset of attributes defined.

In some examples, when no item identified within the image matches the item filter criteria, spatial recognition and/or location based techniques may be used to direct the user to an area of the physical environment that may include items matching the criteria. For example, currently the user may be determined to be in a first section of the retail furniture store based on the location of the first computing device 102 and/or the second computing device 150. Based on collected data (e.g., inventory map data and/or crowd-sourced data discussed with reference to FIG. 2), recliners may be determined to be on a second section of the retail furniture store, and a notification may be provided (e.g., via the application 134) to direct the user to the second section.

Returning to process 300, after the item is determined to match the item filter criteria at optional step 308, the process may include requesting information associated with the item from a data store using the first subset of attributes at step 310 and receiving the information from the data store at step 312, where the information received may include a second subset of attributes of the item. Steps 310 and 312 may be the same or similar to steps 206 and 208 of the process 200, described above in detail with reference to FIG. 2.

At optional step 314, the process 300 may include determining that the item matches the one or more item filter criteria based on the first and second subset of attributes of the item. Optional step 314 may be performed in addition or alternatively to optional step 308. For example, even if optional step 308 (e.g., front end filtering) is performed, only the first subset of attributes may be identified by the trained machine learning model, whereas often the item filter criteria may include one or more criterion that are associated with other attributes of the item, such as price, that may not be identifiable by the trained machine learning model. Therefore, although the item matches or is at least not inconsistent with the item filter criteria at optional step 308, when the second subset of attributes for the image are received as part of the information from the data store, a more complete match determination may be made. Continuing the above example where the physical environment is a retail furniture store, in addition to the type of furniture (e.g., recliner), the item filter criteria may also include a maximum price of $750. The second subset of attributes received from the database may include the price for the recliner, which may be under $750. Therefore, the item may now be determined to match all the item filter criteria.

Based on the determination at optional step 314 that the item matches the one or more item filter criteria, the process 300 may proceed to steps 316 and 318. At step 316, the process 300 may include identifying a spatial location of the item in the image, and at step 318 the process may include generating an icon for the item indicative of at least one attribute from the first or the second subset of attributes that is rendered by the computing device for display on the user interface in association with the spatial location of the item in the image. Steps 316 and 318 may be the same or similar to steps 210 and 212 of the process 200, described above in detail with reference to FIG. 2.

On the other hand, had one of the first or second subset of attributes of the item been inconsistent with at least one of the item filter criteria, a mismatch may have been determined and no further processing related to the item may occur such that no virtual tag (e.g., icon) would be generated and displayed for the item. Alternatively, the virtual tag may be generated, but the virtual generation system may include instructions for the computing device not to render the virtual tag for display.

Accordingly, certain embodiments may include generation of a virtual tag for an item in a physical environment based on item filter criteria. The process 300 described above is provided merely as an example, and may include additional, fewer, different, or differently arranged steps than depicted in FIG. 3.

Figure 4:
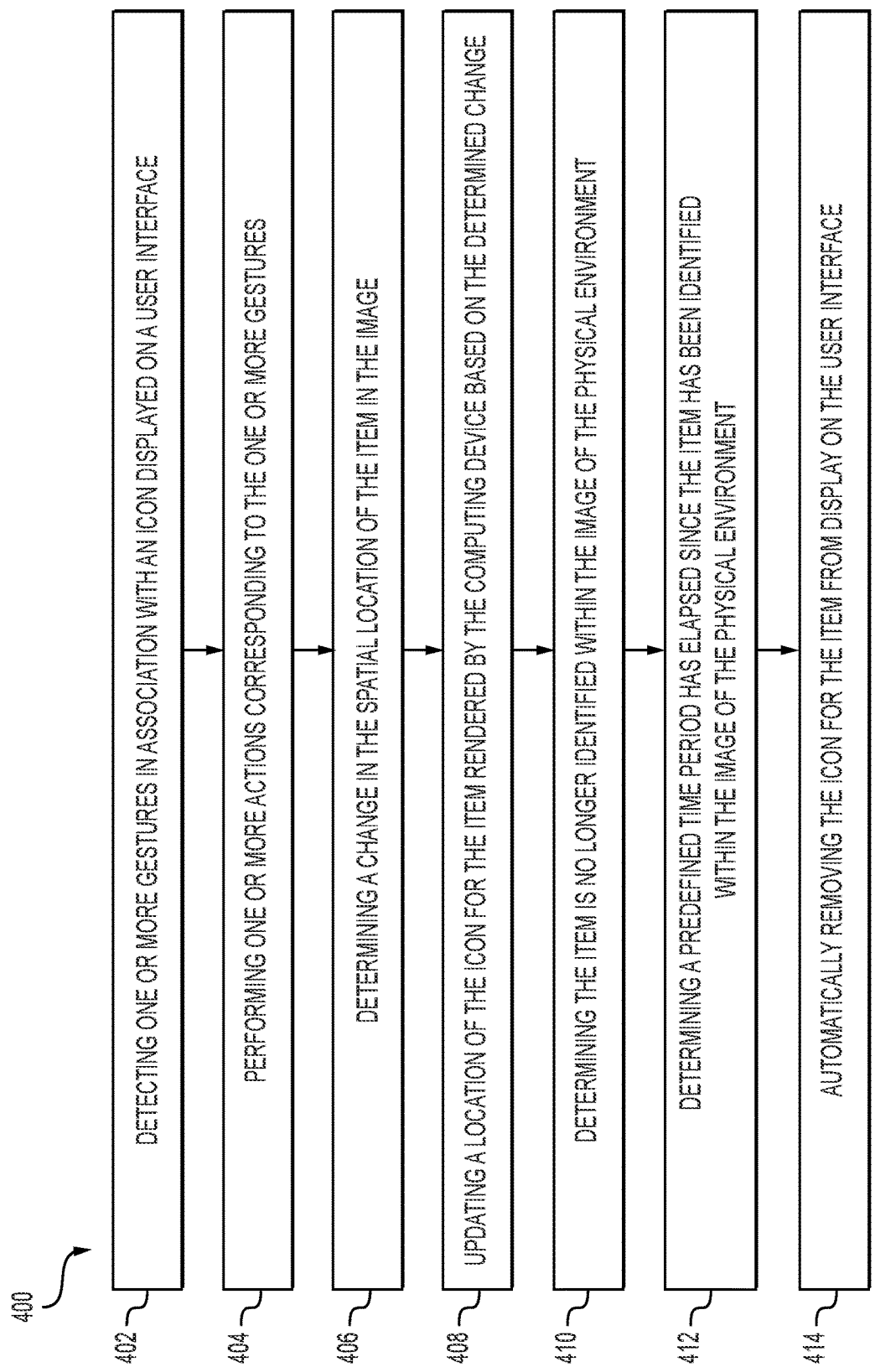
FIG. 4 depicts a flowchart of an exemplary process for interacting with and/or updating a displayed virtual tag for an item in a physical environment, according to certain embodiments.

FIG. 4 depicts a flowchart of an exemplary process 400 for interacting with and/or updating a displayed virtual tag for an item within a physical environment, according to certain embodiments. Process 400 may occur subsequent to the process 200 or the process 300 described above with reference to FIG. 2 and FIG. 3, respectively. In some examples, the process 400 may be performed by a computing device displaying one or more icons as virtual tags for items, such as the first computing device 102 or the second computing device 150. As previously discussed with reference to FIG. 2, the system 108 may provide instructions that may be received and executed by the first computing device 102 or the second computing device 150 to enable the icons to operate (e.g., to be displayed, interacted with to perform actions, and updated), where the instructions may be stored in a cache of the respective computing device.

At step 402, process 400 may include detecting one or more gestures in association with an icon that has been displayed on a user interface of the computing device, such as the first computing device 102 or the second computing device 150. At step 404, the process 400 may include performing one or more actions corresponding to the one or more gestures. One exemplary detected gesture and action performed may include a tap, click, press, zoom-in, or other similar selection of the icon to cause display of additional item information on the user interface, as shown in FIG. 6B below. The additional item information may include additional attributes from the first subset and/or the second subset of attributes. For example, if the at least one attribute of which the icon is indicative includes a price attribute, the additional attributes may include an associated merchant, name, size, color, material, accessory, description, review, and/or availability of the item. Other exemplary detected gestures and actions performed may include a double-tap to favorite the item, or a swipe or a fling of the icon in a given direction to cause the icon to be dismissed. Dismissal of the icon may remove the icon from display on the user interface.

An additional exemplary detected gesture and action performed may include a long-press of the icon to cause a menu with one or more options to be displayed, where one option may be selectable to request assistance in association with the item. In some examples, the selection of the option to request assistance may send a notification to a backend system of the merchant affiliated with the physical environment (e.g., one of the merchant systems 122). In some examples, the notification may include information associated with the item and/or the location of the computing device within the physical environment to allow an employee to more efficiently assist the user.

A further exemplary detected gesture and action performed may include a drag of the icon toward a graphical element on the user interface representing a cart to cause the item to be added to a transaction. In some examples, the addition of the item to the transaction may trigger the sending of a notification to a backend system of the merchant affiliated with the physical environment (e.g., one of the merchant systems 122) to prompt an employee to, e.g., initiate a checkout process for the user where they may retrieve the item from the sales floor or a stock room. In other examples, when the provider is an entity that also provides financial account services for the user, the virtual tag generation system 112 may be communicatively connected (e.g., via an API) to the account services system of the provider and receive account information for the user to display in conjunction with the virtual tags on the user interface. For example, the account information may include a current balance of one or more user accounts (e.g., a checking account or savings account). In some examples, when the item is added to the cart, the price of the item may be deducted from the current balance to reflect a projected balance if the user purchases the item, among other similar features that promote financial health.

In some embodiments, gestures detected and/or actions performed may be saved and used as input for training suggestion and/or recommendation systems. For example, if an item is dismissed, the attributes of that item may be assumed to be less desirable to the user than attributes of an item that is favorited and/or added to the cart.

In other embodiments, the user may be enabled to incorporate and/or integrate an online shopping experience with the user's physical in-store shopping experience through interaction with the icon. For example, if the physical environment is determined to be a particular retail store (e.g., based on the location of the computing device), a uniform resource locator (URL) to an online website associated with the retail store may include within the additional information displayed and/or as part of a menu option displayed in response to a gesture to allow the user to navigate to the online website (e.g., a web application of the retail store). Additionally or alternatively, if the first computing device 102 and/or the second computing device 150 has an application of the retail store locally installed, the user may be provided an option to open the application. In some instances, the retailer may have more inventory available online than in the physical store. For example, additional sizes, colors, materials, and/or accessories may be available for the item that better fits the user's needs or budget. Additionally, the user may prefer to purchase the item online. For example, if the item is bulky and the user does not have the means or desire to transport the item from the physical store to their home, the user may prefer to purchase online to have the item shipped directly to their home.

In further embodiments, one or more other services of the provider, such as price comparison services, may be provided in conjunction with the virtual tag services. For example, when an item is favorited, added to a cart, or otherwise interacted with, the price comparison services may identify items available for purchase from other merchants that are the same or similar to the item and display the associated prices thereof. Therefore, the user may be notified if the item is available at a better deal from a different merchant. In some examples, navigational links to online websites of these other merchants may also be provided.

The above-described exemplary detected gestures and actions performed are illustrative, non-limiting, and non-exhaustive. Other gestures to which other actions correspond may be detected in association with the icon, and performed accordingly.

At step 406, the process 400 may include determining a change in the spatial location of the item in the image. The change may occur due to the user moving the computing device that is capturing and displaying the image, such as the first computing device 102 or the second computing device 150, causing a field of view of the respective cameras 140, 154 to shift, and the image to update. The computing device that is capturing and displaying the image may track a movement of the spatial location of the item within the image. For example, the pixel coordinate of the image corresponding to the predefined point of the item may be stored in a cache by the computing device. The predefined point of the item may be stored in the cache as long as the item remains in the cameras' field of view and thus in the image. The computing device may continue to recognize the predefined point of the item as the field of view of each of the cameras changes.

At step 408, the process 400 may include updating a location of the icon for the item rendered by the computing device based on the determined change. In some examples, the location of the icon displayed on the user interface may be updated by continuously affixing the icon to the predefined point of the item in the image. Step 406 and step 408 of the process 400 may be performed iteratively as the computing device moves causing the field of view of the cameras of the computing device to change, and thus the spatial location of the item in the image being captured to change.

At step 410, the process 400 may include determining the item is no longer identified within the image of the physical environment. For example, the predefined point of the item may no longer be recognized. At step 412, the process 400 may include determining a predefined time period has elapsed since the item has been identified within the image of the physical environment. At step 414, the process 400 may include automatically removing the icon for the item from display on the user interface of the computing device. In addition to removing the icon from display, the icon and associated information for the item may be deleted from the cache of the computing device.

If based on a movement of the computing device, the item re-enters the field of view of the cameras of the computing device, the process 200 or the process 300 (e.g., if item filter criteria is received) described above with reference to FIG. 2 and FIG. 3, respectively, may be repeated to generate the icon for the item that is rendered by the computing device for display on the user interface.

Accordingly, certain embodiments may include interacting with and/or updating a displayed virtual tag for an item within a physical environment. The process 400 described above is provided merely as an example, and may include additional, fewer, different, or differently arranged steps than depicted in FIG. 4.

Figure 5:
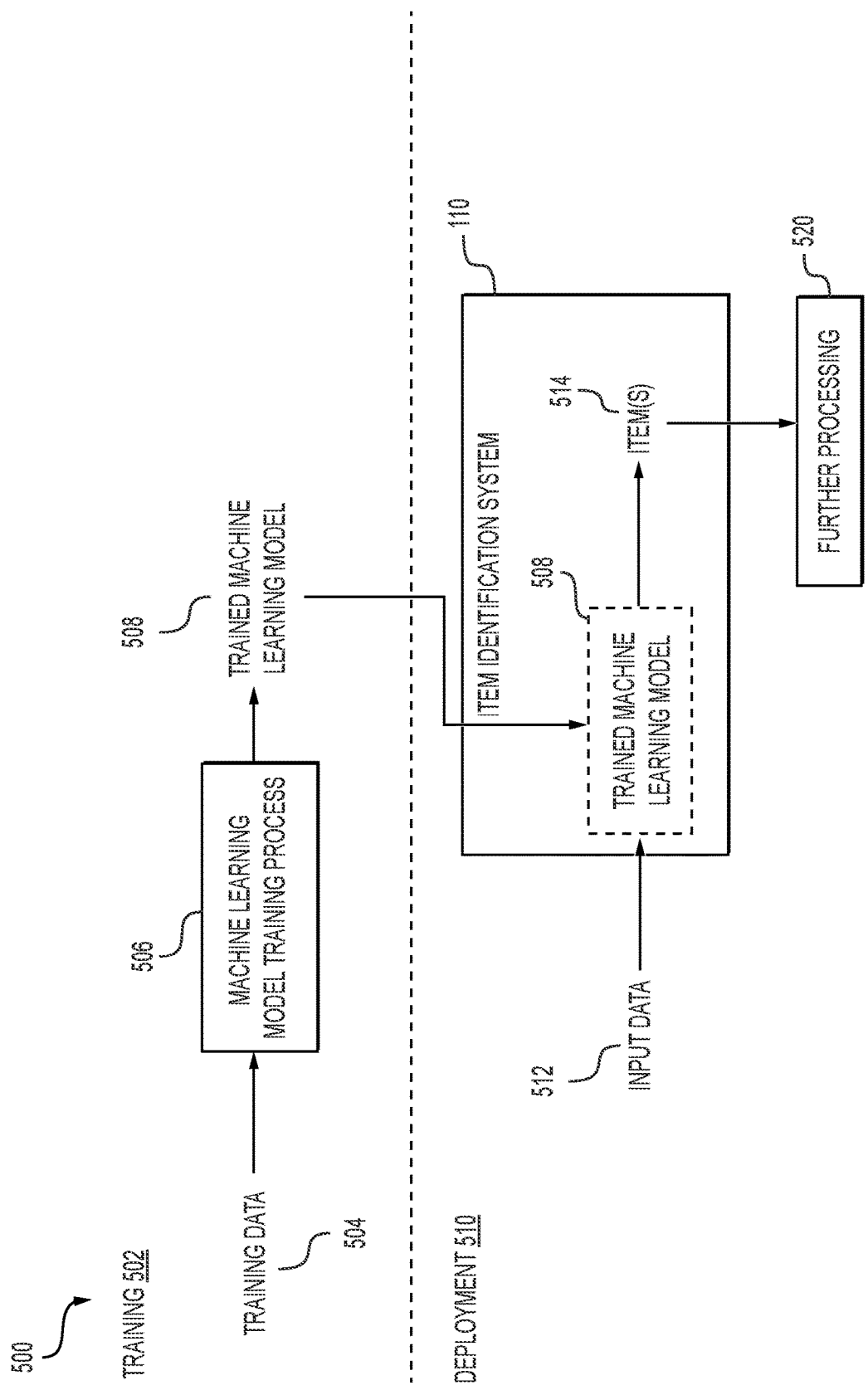
FIG. 5 depicts a block diagram of an exemplary process for training and using a machine learning model to identify items, according to certain embodiments.

FIG. 5 depicts a block diagram of an exemplary process 500 for training and using a machine learning model to identify items, according to certain embodiments. In some embodiments, the item identification system 110 may generate, store, train, and/or use one or more machine learning models configured to identify one or more items present in an image of a physical environment. The system 108 may include a machine learning model and/or instructions associated with the machine learning model, e.g., instructions for generating a machine learning model, training the machine learning model, using the machine learning model, etc. In some examples, different machine learning models may be generated and used for different types of physical environments to account for the different types of items associated therewith. For example, retail furniture stores and retail clothing stores have different types of items included therein, namely furniture items versus clothing items. Therefore, at least a first machine learning model may be generated that is configured to identify furniture items and at least a second machine learning model may be generated that is configured to identify clothing items. Based on the location of the computing device capturing the image of the physical environment (e.g., a location associated with the physical environment of a known type), an appropriate model may be selected for use.

In other embodiments, a third party system or device other than the system 108 may be used to generate and/or train the machine learning model. For example, such a system may include instructions for generating the machine learning model and the training data, and/or instructions for training the machine learning model. Exemplary third party systems may include a system of a merchant affiliated with a physical environment that trains the model to identify items specific to that merchant (e.g., items offered for sale by the merchant in the physical environment) and/or a system of a merchant that manufactures or provides items to merchants affiliated with physical environments that trains the model to identify items manufactured by that merchant. A resulting trained machine learning model may then be provided to system 108 for use.

As depicted in FIG. 5, in some examples, the process 500 may include a training phase 502 and a deployment phase 510. In the training phase 502, at step 506, the process 500 may include receiving and processing training data 504 to generate (e.g., build) a trained machine learning model 508 configured to identify items present in an image of a physical environment.

The training data 504 may include a plurality of images of physical environments that include one or more items present in the images. In some examples, the images may be collected from third party systems, such as the merchant systems 122 or a crowdsourcing system. In other examples, the images may be scraped from websites of merchants that, e.g., include images of physical environments housing a plurality of items.

Generally, a model includes a set of variables, e.g., nodes, neurons, filters, etc., that are tuned, e.g., weighted or biased, to different values via the application of the training data 504. In some examples, the training process at step 506 may employ supervised, unsupervised, semi-supervised, and/or reinforcement learning processes to train the model (e.g., to result in trained machine learning model 508). In some embodiments, a portion of the training data 504 may be withheld during training and/or used to validate the trained machine learning model 508.

When supervised learning processes are employed, labels or scores corresponding to the training data may facilitate the learning process by providing a ground truth. For example, label(s) corresponding to a training image of the training data may predict an identity of one of more items present in the training image, including one or more attributes thereof. Training may proceed by feeding a training image (e.g., a sample) from the training data into the model, the model having variables set at initialized values, e.g., at random, based on Gaussian noise, a pre-trained model, or the like. The model may output a predicted identity for each of one or more items within the training image. The output may be compared with the corresponding label (e.g., the ground truth) to determine an error, which may then be back-propagated through the model to adjust the values of the variables. This process may be repeated for a plurality of samples at least until a determined loss or error is below a predefined threshold. In some examples, some of the training data 504 may be withheld and used to further validate or test the trained machine learning model 508.

For unsupervised learning processes, the training data 504 may not include pre-assigned labels or scores to aid the learning process. Rather, unsupervised learning processes may include clustering, classification, or the like to identify naturally occurring patterns in the training data 504. K-means clustering or K-Nearest Neighbors may also be used, which may be supervised or unsupervised. Combinations of K-Nearest Neighbors and an unsupervised cluster technique may also be used. For semi-supervised learning, a combination of training data 504 with pre-assigned labels or scores and training data 504 without pre-assigned labels or scores may be used to train the model.

When reinforcement learning is employed, an agent (e.g., an algorithm) may be trained to make a decision regarding the identity of item(s) within the sample from the training data 504 through trial and error. For example, upon making a decision, the agent may then receive feedback (e.g., a positive reward if the predicted item(s) are the items within the physical environment), adjust its next decision to maximize the reward, and repeat until a loss function is optimized.

Once trained, the trained machine learning model 508 may be stored and subsequently executed by the item identification system 110 during the deployment phase 510. As described above with reference to the FIGS. 1A-1C, the item identification system 110 may be operated remotely by a server device of the system 108 or locally by the first computing device 102 (e.g., via the application 134). During the deployment phase 510, the trained machine learning model 508 may receive an image of a physical environment as input data 512. The machine learning model 508 may provide as output data 514 each item, including one or more attributes thereof, that is present in the image. The output data 514 may then be provided to other systems for further processing at step 520, such as the virtual tag generation system 112 that may utilize the output data 514 to request information associated with one or more of the items that is used to generate virtual tags for the items.

The example process 500 described above is provided merely as an example, and may include additional, fewer, different, or differently arranged aspects than depicted in FIG. 5.

FIGS. 6A and 6B depict exemplary user interfaces 600A, 600B displaying a virtual tag for an item, according to certain embodiments. The user interfaces 600A, 600B may be displayed on a computing device, such as the first computing device 102 or the second computing device 150, that is capturing and displaying an image 602 of a physical environment. In this example, the physical environment may be a retail furniture store that includes a plurality of furniture items, including sofas, loveseats, recliners, tables, chairs, cabinets, etc. For purposes of FIGS. 6A and 6B, item filter criteria may have been received as input to the computing device. For example, the item filter criteria received may include a recliner that is made by manufacturer XYZ and has a maximum price of $2500. Of each of the plurality of furniture items identified by the item identification system 110 as being present in the image 602, item 604 may be determined as having attributes that match the item filter criteria, and thus an icon 606 may be generated for the item 604 to serve as a virtual tag for the item 604. The icon 606 may indicate at least a merchant associated with the item 604 (e.g., manufacturer XYZ) via the inclusion of a logo or other similar brand identifier of the merchant as part of a configuration of the icon 606. In some examples, the configuration may be tailored to include the logo or other similar brand identifier based on merchant and/or user preferences.

As shown in FIG. 6A, the icon 606 may be rendered for display on the first user interface 600A in association with the spatial location of the item 604 in the image. For example, the icon 606 may be overlaid on the image such that the icon 606 floats or hovers above or over the item 604. The user may interact with the icon 606 via the first user interface 600A by, e.g., tapping the icon at step 608.

The tap may be detected, and in response, the first user interface 600A may be updated to display additional information about the item 604, as shown in the second user interface 600B of FIG. 6B. The additional information about the item 604 may be displayed within a graphical display element 610, such as a pop-up text box, menu, or other similar display element, as part of the virtual tag. The information may include additional attributes (e.g., in addition to the attribute indicated by the icon) from a first subset of attributes determined by the item identification system 110 and/or a second subset of attributes received at the virtual tag generation system 112 responsive to an information request, as described in detail above with reference to FIGS. 2 and 3. For example, the information for the item 604 within the graphical display element 610 may include a name 612, an associated merchant 614, a price 616, dimensions 618, a material 620, available colors 622, details associated with availability (e.g., in stock 624 and available for delivery 626), and a review 628.

The virtual tag may also include one or more control elements (e.g., links, buttons, check boxes, radio buttons, etc.) for causing an action to be performed, and information describing the control elements and/or requesting that the user make a selection of one or more of the control elements.

For example, a URL of the associated merchant's website may be provided as a link 630 as part of the information for the item 604 displayed within the graphical display element 610 of the virtual tag. By clicking or otherwise selecting the link 630, the associated merchant's website may be launched, e.g., on a web browser of the computing device. The associated merchant's website may include further information or specifications for the item 604 and/or other available options for the item 604, such as colors, materials, or sizes that may not be in stock or available in the store. In some examples, the user may also be enabled to purchase the item 604 directly from the merchant via the website, if preferred.

Based on the information for the item 604 provided, the user may then further interact with the icon 606 to either favorite the item, add the item to a transaction, request assistance with respect to the item, and/or dismiss the item, among other examples described in more detail with reference to FIG. 4.

The user interfaces 600A, 600B described above are provided merely as an example, and may include additional, fewer, different, or differently arranged information and/or interactive control elements than depicted in FIGS. 6A and 6B.

In general, any process or operation discussed in this disclosure that is understood to be computer-implementable, such as the processes or operations depicted in FIGS. 2-6B, may be performed by one or more processors of a computer system, such any of the systems or devices in the environments 100A, 100B, or 100C of FIGS. 1A-C, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices, such as one or more of the systems or devices in FIGS. 1A-1C. One or more processors of a computer system may be included in a single computing device or distributed among a plurality of computing devices. A memory of the computer system may include the respective memory of each computing device of the plurality of computing devices.

Figure 7:
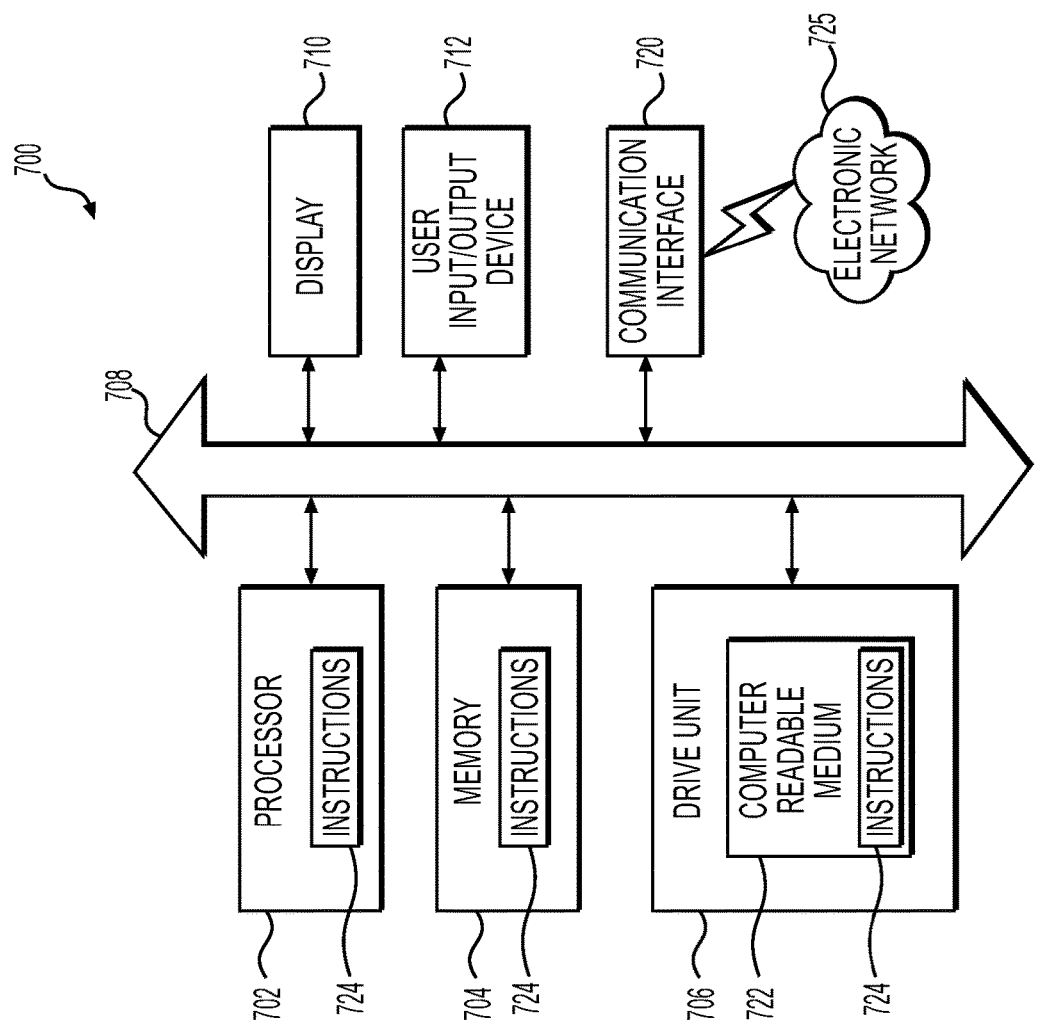
FIG. 7 depicts an example of a computer, according to certain embodiments.

FIG. 7 depicts an example of a computer 700, according to certain embodiments. FIG. 7 is a simplified functional block diagram of a computer 700 that may be configured as a device for executing processes or operations depicted in, or described with respect to, FIGS. 2-6B, according to exemplary embodiments of the present disclosure. For example, the computer 700 may be configured as one of the first computing device 102, the second computing device 150, one of the server-side systems 106, and/or another device according to exemplary embodiments of this disclosure. In various embodiments, any of the systems herein may be a computer 700 including, e.g., a data communication interface 720 for packet data communication. The computer 700 may communicate with one or more other computers 700 using the electronic network 725. The electronic network 725 may include a wired or wireless network similar to the network 104 depicted in FIGS. 1A-1C.

The computer 700 also may include a central processing unit ("CPU"), in the form of one or more processors 702, for executing program instructions 724. The program instructions 724 may include instructions for running the application 134 (e.g., if the computer 700 is first computing device 102) or other device programs related to virtual tag operations (e.g., if the computer 700 is the first computing device 102 of the second computing device 150). The program instructions 724 may include instructions for running one or more operations of the server-side systems 106 (e.g., if the computer 700 is a server device or other similar computing device of one or more of the respective server-side systems 106). The computer 700 may include an internal communication bus 708, and a drive unit 706 (such as read-only memory (ROM), hard disk drive (HDD), solid-state disk drive (SDD), etc.) that may store data on a computer readable medium 722, although the computer 700 may receive programming and data via network communications. The computer 700 may also have a memory 704 (such as random access memory (RAM)) storing instructions 724 for executing techniques presented herein, although the instructions 724 may be stored temporarily or permanently within other modules of computer 700 (e.g., processor 702 and/or computer readable medium 722). The computer 700 also may include user input and output ports 712 and/or a display 710 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to transmitting data, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to training and/or using one or more trained machine learning models to identify items in an image of a physical environment for which virtual tags are generated and rendered for display, any suitable activity may be used.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method comprising:
   receiving an image of a physical environment, the image captured by a computing device and displayed on a user interface of the computing device, the physical environment including a plurality of items each having item attributes;
   receiving one or more item filter criteria associated with at least one of the item attributes;
   providing the image as input to a trained machine learning model configured to identify the plurality of items that are present in the image, including, for each of the plurality of items, a first subset of the item attributes;
   performing a first item filtering to determine, based on the first subset of the item attributes identified for each of the plurality of items, a subset of one or more items from the plurality of items that are at least not inconsistent with the one or more item filter criteria;
   for each of the one or more items within the subset:
     using the first subset of the item attributes to identify the item from a data store; and
     receiving information associated with the item from the data store, the information including a second subset of the item attributes for the item, the second subset of the item attributes including one or more different item attributes from the first subset;
   performing a second item filtering to determine that at least one item from the one or more items within the subset matches the one or more item filter criteria based on the first subset and the second subset of the item attributes;
   identifying a spatial location of the at least one item in the image, the spatial location including a pixel coordinate of the image corresponding to a predefined point of the at least one item;
   generating an icon for the at least one item that is indicative of at least one of the item attributes for the item from the first subset or the second subset; and
   generating and providing instructions to the computing device, the instructions including the icon and the spatial location of the at least one item in the image, wherein the computing device executes the instructions to render the icon for display on the user interface in association with the spatial location of the at least one item in the image such that the rendered icon is overlaid on the image at the pixel coordinate of the image.

2. The method of claim 1, wherein the one or more item filter criteria are input by a user to the computing device, and receiving the one or more item filter criteria comprises receiving the one or more item filter criteria from the computing device.

3. The method of claim 1, wherein the one or more item filter criteria are default item filter criteria, and receiving the one or more item filter criteria comprises:
   receiving the default item filter criteria from another data store, wherein the default item filter criteria received is based on at least one of:
     a type or an identity of the physical environment that is determined based on a location of the computing device, or
     a history of one or more item filter criteria input to the computing device at the type or the identity of the physical environment.

4. The method of claim 1, further comprising:
   using one or more of spatial recognition or a location of the computing device in conjunction with the trained machine learning model to identify the plurality of items within the physical environment.

5. The method of claim 1, further comprising:
   determining a change in the spatial location of the at least one item in the image, wherein a location of the icon for the at least one item rendered by the computing device for display on the user interface in association with the spatial location of the at least one item is updated based on change.

6. The method of claim 1, further comprising:
   causing a performance of one or more actions corresponding to one or more gestures detected by the computing device in association with the at least one item, the one or more actions including at least one of: displaying additional attributes from one or more of the first subset or the second subset on the user interface, favoriting the at least one item, adding the at least one item to a transaction, requesting assistance in association with the at least one item, or dismissing the at least one item.

7. The method of claim 1, further comprising:
tailoring a configuration of the icon for the at least one item based on one or more of preferences of a user of the computing device or preferences of a merchant associated with the at least one item, the configuration specifying the at least one of the item attributes for which the icon is indicative of.

8. The method of claim 1, wherein the icon for the at least one item is automatically removed from display on the user interface after the at least one item is no longer identified within the image of the physical environment and a predefined time period has elapsed.

9. The method of claim 1, wherein the item attributes for each of the plurality of items include one or more of an associated merchant, name, price, size, color, material, accessory, description, review, or availability of the item.

10. The computer-implemented method of claim 1, wherein the image of the physical environment received is a first image of a plurality of image frames received, and the method further comprises:
detecting a change between each pair of consecutive image frames of the plurality of image frames received; and
in response to determining the change is above a predefined threshold, providing a latter image frame of the pair of consecutive image frames as input to the trained machine learning model to determine one or more new items that are present in the image.

11. A system comprising:
at least one memory storing instructions; and
at least one processor operatively connected to the at least one memory and configured to execute the instructions to perform operations, including:
  receiving an image of a physical environment, the image captured by a computing device and displayed on a user interface of the computing device, the physical environment including a plurality of items each having item attributes;
  receiving one or more item filter criteria associated with at least one of the item attributes;
  providing the image as input to a trained machine learning model configured to identify the plurality of items that are present in the image, including, for each of the plurality of items, a first subset of the item attributes;
  applying a two-step item filtering to (1) determine, based on the first subset of the item attributes identified for each of the plurality of items, a subset of one or more items from the plurality of items that are at least not inconsistent with the one or more item filter criteria, and (2) determine that at least one item from the one or more items within the subset matches the one or more item filter criteria based on the first subset and a second subset of the item attributes, wherein the second subset of the item attributes are obtained for each of the one or more items within the subset by:
    using the first subset of the item attributes to identify each of the one or more items from a data store; and
    receiving information associated with each of the one or more items from the data store, the information including a second subset of the item attributes for each of the one or more items, the second subset of the item attributes including one or more different item attributes from the first subset;
  identifying a spatial location of the least one item in the image, the spatial location including a pixel coordinate of the image corresponding to a predefined point of the at least one item;
  generating an icon for the least one item that is indicative of at least one of the item attributes for the item from the first subset or the second subset; and
  generating and providing instructions to the computing device, the instructions including the icon and the spatial location of the at least one item in the image, wherein the computing device executes the instructions to render the icon for display on the user interface in association with the spatial location of the at least one item in the image such that the rendered icon is overlaid on the image at the pixel coordinate of the image.

12. The system of claim 11, wherein the data store is one of:
a merchant data store of a merchant associated with the plurality of items, the merchant data store configured to store information for the plurality of items, or
a central data store of the system configured to store information for a plurality of items collected from each of a plurality of merchants, including the merchant associated with the plurality of items.

13. The system of claim 11, the operations further including:
using one or more of spatial recognition or a location of the computing device in conjunction with the trained machine learning model to identify the plurality of items within the physical environment.

14. The system of claim 11, wherein, in response to the computing device detecting a change in the spatial location of the at least one item in the image, the icon for the at least one item rendered by the computing device for display on the user interface in association with the spatial location is updated based on change.

15. The system of claim 11, wherein, in response to the computing device detecting one or more gestures in association with the at least one item detected by the computing device, causing performance of one or more actions corresponding to the one or more gestures, the one or more actions including at least one of: displaying additional attributes from one or more of the first subset or the second subset on the user interface, favoriting the at least one item, adding the at least one item to a transaction, requesting assistance in association with the at least one item, or dismissing the at least one item.

16. The system of claim 11, wherein the trained machine learning model is executed on one of the computing device, a local computing device separate from and communicatively coupled to the computing device, and a remote server.

17. A method, implemented by a computing device, the method comprising:
capturing an image of a physical environment, the physical environment including a plurality of items each having item attributes;
displaying the image on a user interface of the computing device;
receiving, as input via the user interface, one or more item filter criteria associated with at least one of the item attributes;

providing the image as input to a trained machine learning model executing on the computing device and configured to identify the plurality of items that are present in the image, including a first subset of the item attributes for each of the plurality of items;

performing a front end item filtering to determine, based on the first subset of the item attributes identified for each of the plurality of items, a subset of one or more items from the plurality of items that are at least not inconsistent with the one or more item filter criteria;

for the one or more items within the subset:
identifying a spatial location of the one or more items in the image, the spatial location including a pixel coordinate of the image corresponding to a predefined point of the one or more items; and transmitting a virtual tag request for the one or more items that includes the first subset of the item attributes for the one or more items, the spatial location of the one or more items, and the one or more item filter criteria to a system providing virtual tag generation services, wherein the system is configured to identify the one or more items from a data store using the first subset of the item attributes for the one or more items, receive information associated with the one or more items from the data store, including a second subset of the item attributes for the one or more items, perform a back end item filtering to determine that at least one item from the one or more items matches the one or more item filter criteria based on the first subset and the second subset of the item attributes, and generate an icon for the at least one item indicative of at least one of the item attributes for the at least one item from the first subset or the second subset of the item attributes;

receiving, from the system responsive to the virtual tag request, instructions including the icon for and the spatial location of the at least one item in the image; and executing the instructions to render the icon for display on the user interface such that the icon is overlaid on the displayed image of the physical environment at the pixel coordinate of the displayed image corresponding to the predefined point of the at least one item in the image.

18. The method of claim 17, further comprising:
iteratively detecting a change in the spatial location of the at least one item in the image and updating a location of the icon on the user interface based on the change until the at least one item is no longer identified in the image of the physical environment and a predefined time period has elapsed.

19. The method of claim 17, further comprising:
determining a type or an identity of the physical environment based on a location of the computing device;

identifying a set of item attribute ranges associated with one or more item attributes available for filtering based on the type or the identity of the physical environment; and displaying, via the user interface, the set of item attribute ranges associated with the one or more item attributes, wherein the one or more item filter criteria received as input are selected from the set of item attribute ranges associated with the one or more item attributes.

* * * * *